United States Patent
Naribayashi et al.

(10) Patent No.: US 11,656,920 B2
(45) Date of Patent: May 23, 2023

(54) INFORMATION PROCESSING APPARATUS AND COMPUTER-READABLE STORAGE MEDIUM STORING PARALLEL COMPUTING PROGRAM

(71) Applicant: FUJITSU LIMITED, Kawasaki (JP)

(72) Inventors: Akira Naribayashi, Yokohama (JP); Takafumi Nose, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 17/064,625

(22) Filed: Oct. 7, 2020

(65) Prior Publication Data
US 2021/0157658 A1    May 27, 2021

(30) Foreign Application Priority Data
Nov. 25, 2019    (JP) .............................. JP2019-212155

(51) Int. Cl.
*G06F 9/52* (2006.01)
*G06F 9/54* (2006.01)

(52) U.S. Cl.
CPC ................ *G06F 9/52* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 6,038,604 A * | 3/2000 | Bender | H04L 9/40 709/233 |
| 2008/0148013 A1* | 6/2008 | Jia | G06F 9/5061 712/E9.016 |
| 2009/0067334 A1* | 3/2009 | Archer | G06F 9/546 370/238 |
| 2010/0017420 A1* | 1/2010 | Archer | G06F 15/17337 707/E17.009 |
| 2011/0125824 A1 | 5/2011 | Naruse et al. | |
| 2011/0225226 A1* | 9/2011 | Archer | G06F 9/54 709/201 |

FOREIGN PATENT DOCUMENTS

| | | |
|---|---|---|
| JP | H11-110362 A | 4/1999 |
| JP | 2011-108202 A | 6/2011 |
| JP | 5056844 B2 * | 10/2012 ........... G06F 15/173 |

* cited by examiner

*Primary Examiner* — Charles E Anya
(74) *Attorney, Agent, or Firm* — Fujitsu Patent Center

(57) ABSTRACT

A processing unit generates, in the initial setting of all-to-all communication between processes, a unique node-order process number for each process on the basis of hardware information, computes the virtual rank number of each process on the basis of the node-order process number of the process, and stores the computed virtual rank numbers in a storage unit. When performing the al-to-all communication between the processes, the processing unit determines the communication partner process of each process for the current step in the all-to-all communication by performing an exclusive OR operation between the virtual rank number of the process, stored in the storage unit, and the step number of the current step. Then, the processing unit performs communication from each process to the corresponding communication partner process.

7 Claims, 31 Drawing Sheets

FIG. 14A

CPU CORE NUMBER TABLE 121

| NODE NUMBER | CPU CORE NUMBER |
|---|---|
| 0 | 0 |
| 0 | 1 |
| 0 | 2 |
| ... | ... |
| 0 | 11 |
| 1 | 12 |
| 1 | 13 |
| ... | ... |

FIG. 14B

RANK NUMBER TABLE 122

| CPU CORE NUMBER | RANK NUMBER |
|---|---|
| 0 | 2 |
| 1 | 2 |
| 2 | 6 |
| ... | ... |
| 12 | 4 |
| 13 | 4 |
| 14 | 3 |
| ... | ... |

FIG. 15A

NODE-ORDER PROCESS NUMBER TABLE 123

| CPU CORE NUMBER | NODE-ORDER PROCESS NUMBER |
|---|---|
| 0 | 0 |
| 1 | 0 |
| 2 | 1 |
| ... | ... |
| 12 | 2 |
| 13 | 2 |
| 14 | 3 |
| ... | ... |

FIG. 15B

VIRTUAL RANK NUMBER TABLE 124

| CPU CORE NUMBER | VIRTUAL RANK NUMBER |
|---|---|
| 0 | 0 |
| 1 | 0 |
| 2 | 7 |
| ... | ... |
| 12 | 2 |
| 13 | 2 |
| 14 | 5 |
| ... | ... |

| STEP NUMBER | NODE-ORDER PROCESS NUMBER WITH RESPECT TO VIRTUAL RANK NUMBER 7 | VIRTUAL RANK NUMBER OF TRANSMISSION DESTINATION WITH RESPECT TO VIRTUAL RANK 7 |
|---|---|---|
| 0 | 0^7=7 | 1 |
| 1 | 1^7=6 | 6 |
| 2 | 2^7=5 | 3 |
| 3 | 3^7=4 | 4 |
| 4 | 4^7=3 | 5 |
| 5 | 5^7=2 | 2 |
| 6 | 6^7=1 | 7 |
| 7 | 7^7=0 | 0 |

FIG. 17

| STEP NUMBER | STEP EVALU- ATION VALUE | NODE-ORDER PROCESS NUMBER WITH RESPECT TO VIRTUAL RANK NUMBER 7 | VIRTUAL RANK NUMBER OF TRANSMISSION SOURCE WITH RESPECT TO VIRTUAL RANK 7 |
|---|---|---|---|
| 0 | 0 | 0^7=7 | 1 |
| 1 | 7 | 7^7=0 | 0 |
| 2 | 2 | 2^7=5 | 3 |
| 3 | 5 | 5^7=2 | 2 |
| 4 | 4 | 4^7=3 | 5 |
| 5 | 3 | 3^7=4 | 4 |
| 6 | 6 | 6^7=1 | 7 |
| 7 | 1 | 1^7=6 | 6 |

FIG. 18

| STEP NUMBER | NODE-ORDER PROCESS NUMBER WITH RESPECT TO VIRTUAL RANK NUMBER 5 | VIRTUAL RANK NUMBER OF TRANSMISSION DESTINATION WITH RESPECT TO VIRTUAL RANK NUMBER 5 |
|---|---|---|
| 0 | 0^5=5 | 1 |
| 1 | 1^5=4 | 4 |
| 2 | 2^5=7 | — |
| 3 | 3^5=6 | 6 |
| 4 | 4^5=1 | 5 |
| 5 | 5^5=0 | 0 |
| 6 | 6^5=3 | 3 |
| 7 | 7^5=2 | 2 |

FIG. 28

INFORMATION PROCESSING APPARATUS AND COMPUTER-READABLE STORAGE MEDIUM STORING PARALLEL COMPUTING PROGRAM

CROSS-REFERENCE TO RELATED APPLICATION

This application is based upon and claims the benefit of priority of the prior Japanese Patent Application No. 2019-212155, filed on Nov. 25, 2019, the entire contents of which are incorporated herein by reference.

FIELD

The embodiments discussed herein relate to an information processing apparatus and a computer-readable storage medium storing a parallel computing program.

BACKGROUND

There is a parallel processing system in which a large-computation problem is divided into a plurality of smaller sub-problems and a plurality of information processing apparatuses connected to a network are caused to perform the computation in parallel. In the parallel processing system, the computation may involve communication between the information processing apparatuses. For this reason, a communication library such as a message passing interface (MPI) library may be used in creating an application program for such a parallel processing system. With the communication library, a user does not need to define the details of a communication procedure between information processing apparatuses in the application program.

For example, there has been proposed a method for data communication between processing elements of a distributed-memory parallel computer, which are connected to each other over a network. In this proposal, at each communication step, all n processing elements are divided into pairs and each pair of processing elements communicate with each other. In this connection, the pairs of processing elements at a certain step are different from those at previous steps. After n communication steps, all-to-all communication is complete, in which every processing element transmits data stored therein to all the processing elements.

There also has beer, proposed an inter-process communication method in a cluster system using servers that perform a plurality of processes. In this proposed inter-process communication method, the servers determine their transmission destination servers in each round of all-to-all inter-process communication. More specifically, each server selects a different server as its transmission destination server in the same round. Each server then selects the processes operating on the transmission destination server, in order, as a transmission destination process and transmits transmission data to the selected transmission destination process.

See, for example, Japanese Laid-open Patent Publication Nos. 11-110362 and 2011-108202.

It is considered that a plurality of nodes provided in an information processing apparatus are designed to be able to execute a plurality of processes in parallel. When the plurality of processes perform all-to-all communication, the communication partner process of each process may be determined using identification numbers previously assigned to the processes by a user, a prescribed application, or another. The identification numbers may be called rank numbers or simply ranks. However, in the case where the communication partners are determined using the identification numbers previously assigned by the user, prescribed application, or another and the determined pairs of processes perform communication in parallel, congestion may occur in a communication path within the information processing apparatus.

SUMMARY

According to one aspect, there is provided an information processing apparatus that includes: a memory configured to store therein virtual rank numbers of a plurality of processes, the virtual rank numbers being respectively unique to the plurality of processes; and a processor configured to perform a procedure including generating, in initial setting of all-to-all communication between the plurality of processes, node-order process numbers of the plurality of processes, based on hardware information, the node-order process numbers being respectively unique to the plurality of processes, computing the virtual rank numbers of the plurality of processes, based on the node-order process numbers and storing the computed virtual rank numbers in the memory, determining, in performing the all-to-all communication between the plurality of processes, a communication partner process of each of the plurality of processes for a current step in the all-to-all communication by performing an exclusive OR operation between a virtual rank number of the process, stored in the memory, and a step number of the current step, and performing a communication session from the process to the determined communication partner process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 14A and 14B illustrate examples of data structures;

FIGS. 15A and 15B illustrate examples of data structures;

FIG. 17 illustrates an example of computing the virtual rank number of a transmission destination;

FIG. 18 illustrates an example of computing the virtual rank number of a transmission source;

FIG. 28 illustrates an example of computing the virtual rank number of a transmission destination;

DESCRIPTION OF EMBODIMENTS

Hereinafter, preferred embodiments will be described with reference to the accompanying drawings.

First Embodiment

A first embodiment will be described.

Figure 1:
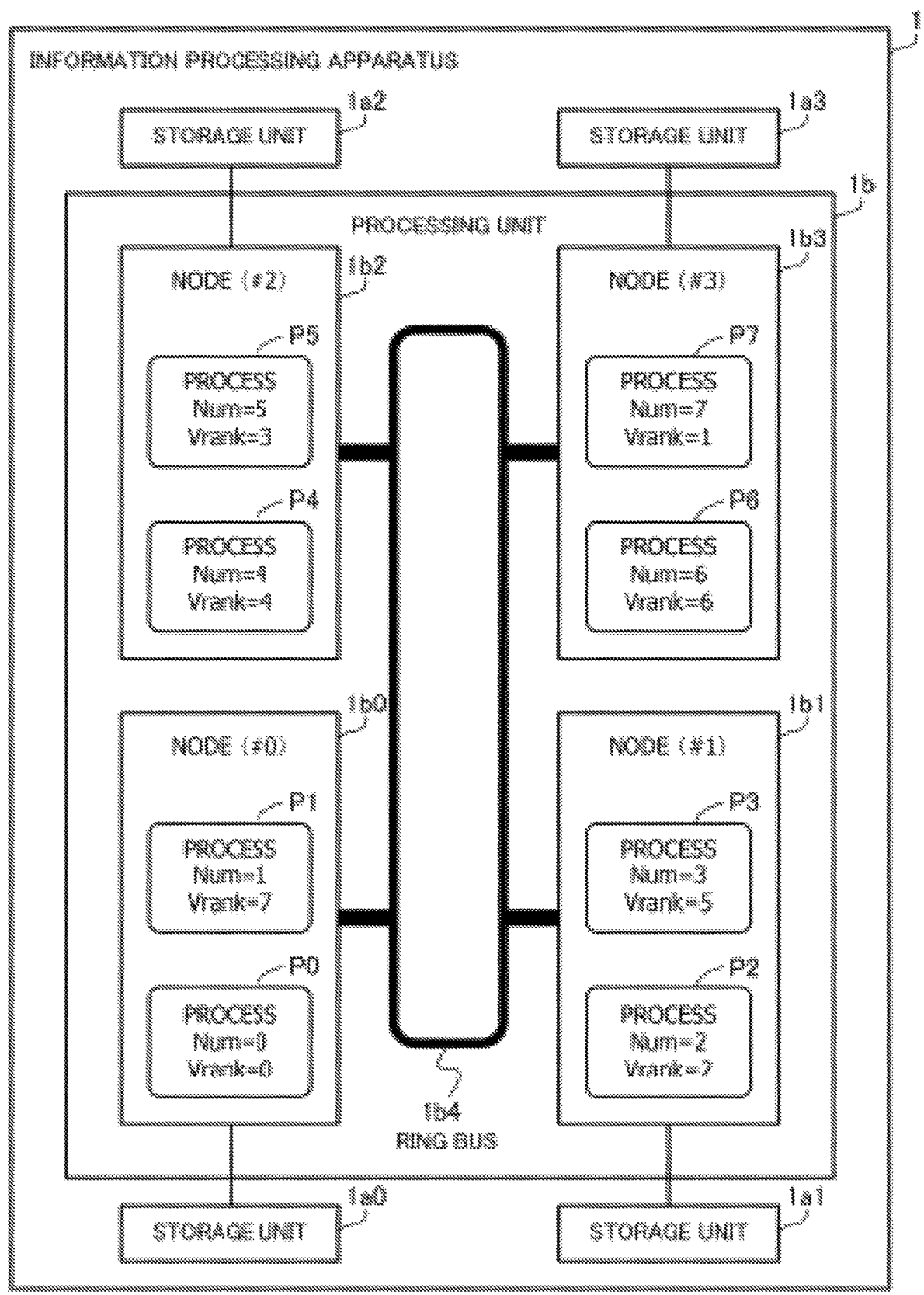
FIG. 1 illustrates an example of an information processing apparatus according to a first embodiment.

FIG. 1 illustrates an example of an information processing apparatus according to the first embodiment.

The information processing apparatus 1 includes storage units 1a0, 1a, 1a2, and 1a3 and a processing unit 1b.

The storage units 1a0, 1a1, 1a2, and 1a3 are main storage devices that store therein data that is used by the processing unit 1b in processing. For example, random access memories (RAMs) such as high bandwidth memory 2 (HBM2) devices are used as the storage units 1a0, 1a1, 1a2, and 1a3.

The processing unit 1b performs a plurality of processes belonging to a job in parallel. The processing unit 1b is a processor such as a central processing unit (CPU), for example. The processing unit 1b includes a plurality of processor cores and may be called multicore processor. Processor cores may be called CPU cores or simply cores. The plurality of cores in the processing unit 1b are divided into groups each including a prescribed number of cores. Each group formed of the prescribed number of cores is called a node. Each node able to use two or more cores belonging to the own node to per two or more processes in parallel. Each node in the processing unit 1b is connected to a bus within the processing unit 1b.

For example, the processing unit 1b includes nodes 1b0, 1b1, 1b2, and 1b3 and a ring bus 1b4. Each node 1b0, 1b1, 1b2, and 1b3 has two or more cores. In this connection, these cores are not illustrated in FIG. 1. The node 1b0 is connected to the storage unit 1a0. The node 1b1 is connected to the storage unit 1a1. The node 1b2 is connected to the storage unit 1a2. The node 1b3 is connected to the storage unit 1a3. These storage units 1a0, 1a1, 1a2, 1a3 are collectively referred to as a "storage unit," and it may be said that the "storage unit" includes the storage units 1a0, 1a, 1a2, and 1a3.

The ring bus 1b4 is a communication path for use in communication between the nodes. To the ring bus 1b4, the nodes 1b0, 1b2, 1b3, and 1b1 are connected clockwise in this order.

In the processing unit 1b, the nodes 1b0, 1b, 1b2, and 1b3 are able to perform information processing in parallel. During the information processing, processes performed by the nodes 1b0, 1b1, 1b2, and 1b3 may transmit data to other processes. The data communication between the processes are implemented by using a communication library such as MPI, for example. As the data communication between the processes, there collective communication that involves data transmission from a plurality of processes at a time. The collective communication includes all-to-all communication in which every process transmits data to all the processes. The all-to-all communication is implemented by performing one-to-one communication sessions between the processes. That is to say, the all-to-all communication performed, with the communication partner process of each process changed in every step of the communication.

For example, the node 1b0 performs processes P0 and P1. The node 1b1 performs processes P2 and P3, The node 1b2 performs processes P4 and P5. The node 1b3 performs processes P6 and P7.

A pair of processes in different nodes perform communication through the ring bus 1b4. The ring bus 1b4 has a clockwise communication path and a counterclockwise communication path, which are formed independently of each other. Therefore, clockwise communication and counterclockwise communication do not interfere with each other. In addition, the communication band available in a connection pathway between each node 1b0, 1b1, 1b2, and 1b3 and the ring bus 1b4 is much wider than that available in each communication path inside the ring bus 1b4. Therefore, it is certain that congestion does not occur in a connection pathway if communication from a node to the ring bus 1b4 and communication from the ring bus 1b4 to the node are performed simultaneously through the connection pathway.

Routing in the ring bus 1b4 depends on a pair of transmission source node and transmission destination node, and is not dynamically changed. The rules for the routing in the ring bus 1b4 are as follows.

The first rule is that, in the case where a clockwise path and a counterclockwise path differ in the number of hops, a path with a smaller number of hops is used.

The second rule is that, in the case where the clockwise path and the counterclockwise path have the same number of hops, the counterclockwise path is used for a pair of nodes 1b0 and 1b3 and the clockwise path is used for a pair of nodes 1b1 and 1b2.

The number of hops indicates how many nodes data passes by on the ring bus 1b4. For example, the number of hops is one in counterclockwise data transmission from the node 1b0 to the node 1b1. In addition, the number of hops is two in counterclockwise data transmission from the node 1b0 to the node 1b3. The number of hops is three in counterclockwise data transmission from the node 1b0 to the node 1b2.

Each node 1b0, 1b1, 1b2, and 1b3 is previously assigned a node number. The node 1b0 is assigned a node number "#0." The node 1b1 is assigned a node number "#1." The node 1b2 is assigned a node number "#2." The node 1b3 is assigned a node number "#3." Node numbers are assigned to nodes such that the above order of the node numbers is obtained by rotation movement and/or symmetrical movement. Hardware information including the node number of each node is stored in the storage units 1a0 to 1a3 or a prescribed storage device (not illustrated) connected to the processing unit 1b.

When performing the initial setting of all-to-all communication between the processes, the processing unit 1b generates a unique node-order process number for each process on the basis of the hardware information. The node-order process numbers are assigned to the processes P0 to P7 in order of node number. In the case where one node performs a plurality of processes, the processing unit 1b assigns a node-order process number to each process of the node in a certain order. In FIG. 1, "Num" denotes a node-order process number.

For example, the node 1b0 generates a node-order process number Num=0 for the process P0. The node 1b0 generates a node-order process number Num=1 for the process P1. The node 1b1 generates a node-order process number Num=2 for the process P2, and a node-order process number Num*3 for the process P3. The node 1b2 generates a node-order process number Num=4 for the process P4, and a node-order process number Num=5 for the process P5. The node 1b3 generates a node-order process number Num=6 for the process P6, and a node-order process number Num=7 for the process P7.

The processing unit 1b then computes the virtual rank number of each process on the basis of its node-order process number and stores the computed virtual rank number in a storage unit. The virtual rank numbers are information that is used for determining communication partner processes when all-to-all communication is performed between processes. In FIG. 1, "Vrank" denotes a virtual rank number. A virtual rank number is computed by the following equation (1) using a node-order process number. In this connection, the equation (1) is written in C language.

$$Vrank = (Num \% 2 == 0 ? Num : Size - Num) \quad (1)$$

Here, "Size" denotes the total number of processes in the processing unit 1b. In the example of FIG. 1, Size=8. The equation (1) has the following meanings. First, if the node-order process number of a process is an even number, the node-order process number is taken as the virtual rank number of the process. Second, if the node-order process number of the process is an odd number, a value obtained by subtracting the node-order process number from Size is taken as the virtual rank number of the process.

For example, the node 1b0 computes a virtual rank number Vrank=0 for the process P0. The node 1b0 computes a virtual rank number Vrank=7 for the process P1. The node 1b1 computes a virtual rank number Vrank=2 for the process P2 and a virtual rank number Vrank=5 for the process P3. The node 1b2 computes a virtual rank number Vrank=4 for the process P4 and a virtual rank number Vrank=3 for the process P5. The node 1b3 computes a virtual rank number Vrank=6 for the process P6 and a virtual rank number Vrank=1 for the process P7. The nodes 1b0, 1b1, 1b2, and 1b3 store the computed virtual rank numbers in the storage units 1a0, 1a1, 1a2, and 1a3, respectively.

When performing the all-to-all communication between the plurality of processes in steps, the processing unit 1b determines the communication partner process of each process for the current step in the all-to-all communication by performing an exclusive OR operation between the virtual rank number of the process, stored in a storage unit, and the step number of the current step.

As described earlier, all-to-all communication is implemented by combinations of one-to-one communication sessions. There are a plurality of communication rounds in the all-to-all communication, and the step number in the all-to-all communication indicates which round the current communication round is. In this connection, the step number in the all-to-all communication is counted from zero. In the example of the first embodiment, one process transmits data to eight processes in total, including the own process, and therefore the total number of steps is eight. Here, a step number is denoted by "Step." A value range of Step depends on whether Size is power of two or not. Step ranges from zero to "Size−1" in the case where Size is power of two. In this case, a variable Maxstep denoting the number of steps is taken to be Maxstep=Size. In the case where Size is not power of two, the variable Maxstep takes a value that is the smallest power of two greater than Size. For example, in the case of Size=5, the value that is the smallest power of two greater than five is eight. Therefore, the number of steps is 8 (Step=0 to 7) and Maxstep=8 is obtained.

The processing unit 1b obtains the node-order process number Num_d of a data transmission destination process with respect to a process with virtual rank number Vrank with the equation (2).

$$Num\_d = Step \hat{\ } Vrank \quad (2)$$

Here, "$\hat{\ }$" is an exclusive OR (XOR) operator.

The processing unit 1b then computes the virtual rank number of the data transmission destination process with respect to the process with virtual rank number Vrank by substituting Num_d for Num in the equation (1).

In one-to-one communication, each process receives data, and therefore its data transmission source process may be specified. For example, the processing unit 1b obtains the node-order process number Num_s of a data transmission source process with respect to each process with the following equation (3).

$$Num\_s = (Step \% 2 == 0 ? Step : Maxstep - Step) \hat{\ } Vrank \quad (3)$$

The equation (3) has the following meanings. First, if Step is an even number, an exclusive OR operation between Step and Vrank is executed. Second, if Step is an odd number, an exclusive OR operation between the value of (Maxstep−Step) and Vrank is executed.

The processing unit 1b then computes the virtual rank number of the data transmission source process with respect to the process with virtual rank number Vrank by substituting Num_s for Num in the equation (1).

In this connection, the virtual rank number of a data transmission destination process and the virtual rank number of a data transmission source process with respect to a certain process are determined by a node executing the certain process.

For example, in Step=0, the data transmission destination process of each process is as follows.

The data transmission destination of the process P0 is the process P0. The data transmission destination of the process P1 is the process P7. The data transmission destination of the process P2 is the process P2. The data transmission destination of the process P3 is the process P5. The data transmission destination of the process P4 is the process P4. The data transmission destination of the process P5 is the process P3. The data transmission destination of the process P6 is the process P6. The data transmission destination of the process P7 is the process P1. The processing unit 1b performs data transmission from the processes to their corresponding data transmission destinations in parallel. Also, in addition to the data transmission, the processing unit 1b performs data reception of the processes from their corresponding data transmission source processes. When all the one-to-one communication sessions of the processes in Step=0 are complete, the processing unit 1b increments the step number and the next step begins. The completion of the one-to-one communication sessions is synchronized among the processes, for example, at every step. Alternatively, the completion of the one-to-one communication sessions may be synchronized among the processes each time a plurality of steps are executed.

For example, in Step=1, the data transmission destination process of each process is as follows.

The data transmission destination of the process P0 is the process P1. The data transmission destination of the process P1 is the process P6. The data transmission destination of the process P2 is the process P3. The data transmission destination of the process P3 is the process P4. The data transmission destination of the process P4 is the process P5. The data transmission destination of the process P5 is the process P2. The data transmission destination of the process P6 is the process P7. The data transmission destination of the process P7 is the process P0. In addition to the data transmission from the processes to their corresponding data transmission destination processes, the processing unit 1b performs data reception of the processes from their corresponding data transmission source processes. In the subsequent steps, the processing unit 1b performs one-to-one communication between the processes in the same manner until the final step ends. By doing so, the processing unit 1b performs the all-to-all communication.

As described above, when performing the initial setting of the all-to-all communication between the plurality of processes, the information processing apparatus 1 generates a unique node-order process number for each process on the basis of the hardware information, computes the virtual, rank number of each process on the basis of the node-order process number, and stores the virtual rank numbers of the processes in the storage unit. When performing the all-to-all communication between the plurality of processes, the information processing apparatus 1 determines the communication partner process of each process for the current step in the all-to-all communication by performing the exclusive OR operation between the virtual rank number of the process, stored in the storage unit, and the step number of the current step. After that, the information processing apparatus 1 performs communication from the processes to their corresponding communication partner processes.

The above approach reduces the occurrence of congestion. Here, assume, for example, the case where all-to-all communication is performed between a plurality of processes and the communication partner process of each process is determined based on identification numbers previously assigned to the processes by a user, a prescribed application, or another. The use of such previously-assigned identification numbers increases the possibility of sharing a part of the clockwise path or a part of the counterclockwise path in the ring bus 1b4 by a plurality of one-to-one communication sessions, i.e., the possibility of congestion.

By contrast, the information processing apparatus 1 determines a communication partner process on the basis of a virtual rank number that is computed using a node-order process number based on hardware, information. More specifically, the information processing apparatus 1 determines the communication partner process of each process with the above equations (1) to (3) using the virtual rank number of the process, which reduces the possibility of sharing a part of the clockwise path or a part of the counterclockwise path in the ring bus 1b4 among a plurality of one-to-one communication sessions.

For example, in the above-described case of Step=0, the clockwise communication from the process P3 to the process P5 and the clockwise communication from the process P5 to the process P3 do not share any part of the clockwise communication path on the ring bus 1b4. In addition, the counterclockwise communication from the process P1 to the process P7 and the counterclockwise communication from the process P7 to the process P1 do not share any part of the counterclockwise communication path on the ring bus 1b4.

In the above-described case of Step=1, the clockwise communication from the process P3 to the process P4 and the clockwise communication from the process P5 to the process P2 do not share any part of the clockwise communication path on the ring bus 1b4. In addition, the counterclockwise communication from the process P1 to the process P6 and the counterclockwise communication from the process P7 to the process P0 do not share any part of the counterclockwise communication path on the ring bus 1b4. The same applies to the other Steps. That is, sharing a part of the clockwise path or a part of the counterclockwise path on the ring bus 1b4 among a plurality of one-to-one communication sessions is prevented.

As described above, the information processing apparatus 1 assigns each process a virtual rank number, which is a non-uniform memory access (NUMA)-conscious identification number, so that the execution order of one-to-one communication sessions forming all-to-all communication is rearranged to minimize the occurrence of congestion.

The above approach makes it possible to reduce the occurrence of congestion in the ring bus 1b4. This achieves fast all-to-all communication. The fast all-to-all communication is performed, irrespective of a policy of assigning each process an identification number by an external factor such as a user, an operating system (OS), a communication library, or a job scheduler. In addition, the information processing apparatus 1 determines be communication partner process of each process with simple computation using an exclusive OR operation, which leads to determining the communication partner process at high speed and in turn to achieving fast all-to-all communication.

Second Embodiment

A second embodiment will now be described.

Figure 2:
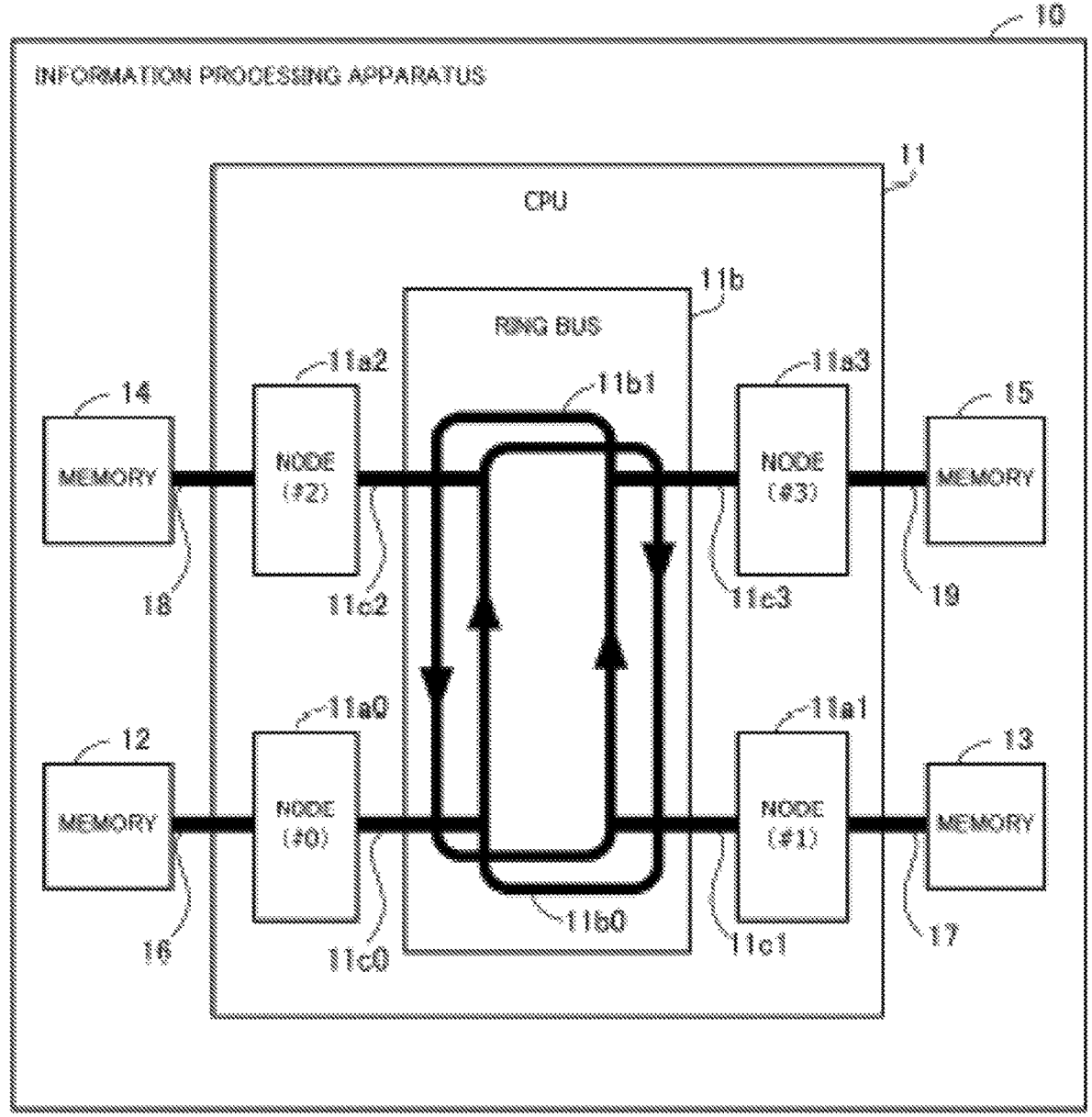
FIG. 2 illustrates an example of hardware of an information processing apparatus according to a second embodiment.

FIG. 2 is an example of hardware of an information processing apparatus according to the second embodiment.

The information processing apparatus 10 includes a CPU 11 and memories 12, 13, 14, and 15. The CPU 11 corresponds to the processing unit 1b of the first embodiment. The memories 12, 13, 14, and 15 correspond to the storage units 1a0, 1a1, 1a2, and 1a3 of the first embodiment.

The CPU 11 includes nodes 11a0, 11a1, 11a2, and 11a3 and a ring bus 11b, number of nodes in the CPU 11 is not limited to four and any number of nodes may be provided.

Each node 11a0, 11a1, 11a2 and 11a3 has a plurality of cores, and the plurality of cores perform a plurality of processes belonging to the same job in parallel.

The ring bus 11b provides communication paths between the nodes. The nodes 11a0, 11a1, 11a2, and 11a3 are connected to the ring bus 11b. For example, the substrate surface on which the CPU 11 is mounted is partitioned for the nodes 11a0, 11a1, 11a2, and 11a3 as illustrated in FIG. 2. When this substrate is seen from above, the nodes 11a0, 11a2, 11a3, and 11a1 are connected to the ring bus 11b clockwise in this order. Each node 11a0, 11a1, 11a2, and 11a3 is assigned a node number. The node 11a0 is assigned a node number "#0." The node 11a1 is assigned a node number "#1." The node 11a2 is assigned a node number "#2." The node 11a3 is assigned a node number "#3." In this connection, the node numbers may be assigned such that they are located in the order of "#0," "#2," "#3," and "#1" clockwise by rotation movement and/or symmetrical movement.

The ring bus 11b includes a first communication path 11b0 and a second communication path 11b1. The first communication path 11b0 is a clockwise communication path. The second communication path 11b1 is a counter-clockwise communication path. The first and second communication paths 11b0 and 11b1 are physically independent of each other. Communication through the first communication path 11b0 and communication through the second communication path 11b1 do not interfere with each other.

The CPU 11 has connection buses 11c0, 11c1, 11c2, and 11c3 each connecting a node and the ring bus. The node 11a0 is connected to the first and second communication paths 11b0 and 11b1 with the connection bus 11c0. The node 11a1 is connected to the first and second communication paths 11b0 and 11b1 with the connection bus 11c1. The node 11a2 is connected to the first and second communication paths 11b0 and 11b1 with the connection bus 11c2. The node 11a3 is connected to the first and second communication paths 11b0 and 11b1 with the connection bus 11c3.

The memories 12, 13, 14, and 15 are main memory devices respectively connected to the nodes 11a0, 11a1, 11a2, and 11a3. For example, RAMs such as HBM2 devices may be used as the memories 12, 13, 14, and 15, for example. The memories 12, 13, 14, and 15 store therein programs that are executed by the corresponding nodes 11a0, 11a1, 11a2, and 11a3, and data that is used during execution of the programs. Each memory 12, 13, 14, and 15 may be used as both a transmit buffer for storing therein data to be transmitted and a receive buffer for storing therein received data.

Here, the information processing apparatus 10 further includes connection buses 16, 17, 18, and 19 respectively connecting the nodes of the CPU 11 and the memories 12, 13, 14, and 15. The connection bus 16 connects the node 11a0 and the memory 12. The connection bus 17 connects the node 11a1 and the memory 13. The connection bus 18 connects the node 11a2 and the memory 14. The connection bus 19 connects the node 11a3 and the memory 15.

The communication bands available n the connection buses 11c0 to 11c3 and 16 to 19 are much wider than those available in the first and second communication paths 11b0 and 11b1. Therefore, even if a plurality of communication sessions share any of the connection buses 11c0 to 11c3 and 16 to 19, congestion does not occur.

Figure 3:
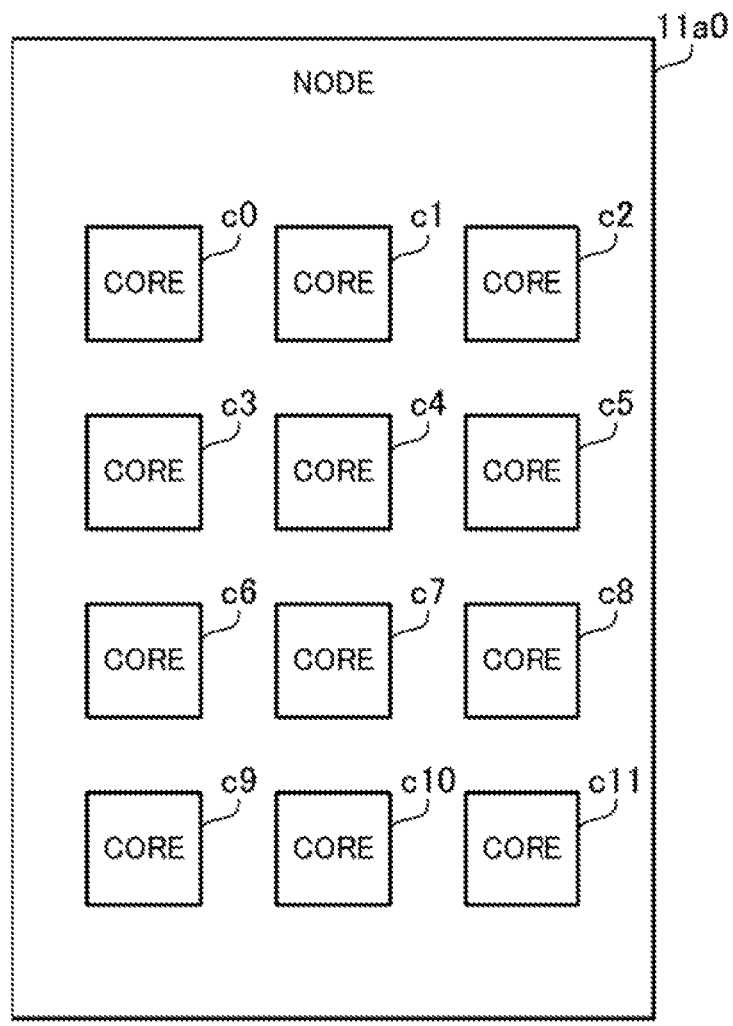
FIG. 3 illustrates an example of cores belonging to a node.

FIG. 3 illustrates an example of cores belonging to a node.

One node has twelve computing cores. Although FIG. 3 exemplifies the cores of the node 11a0, the nodes 11a1, 11a2, and 11a3 each have twelve cores as well. In this connection, each node may further have an assistant core that is mainly used for controlling the node.

The node 11a0 has cores c0 to c11. In the node 11a0, the cores c0 to c11 are able to perform a plurality of processes. One process is executed by one or more cores. For example, to perform one process, a plurality of cores is able to perform a plurality of threads belonging to the one process in parallel. In this connection, the number of cores in each node is not limited to twelve and any other number of cores (for example, two, four, or sixteen cores) may be provided.

Figure 4:
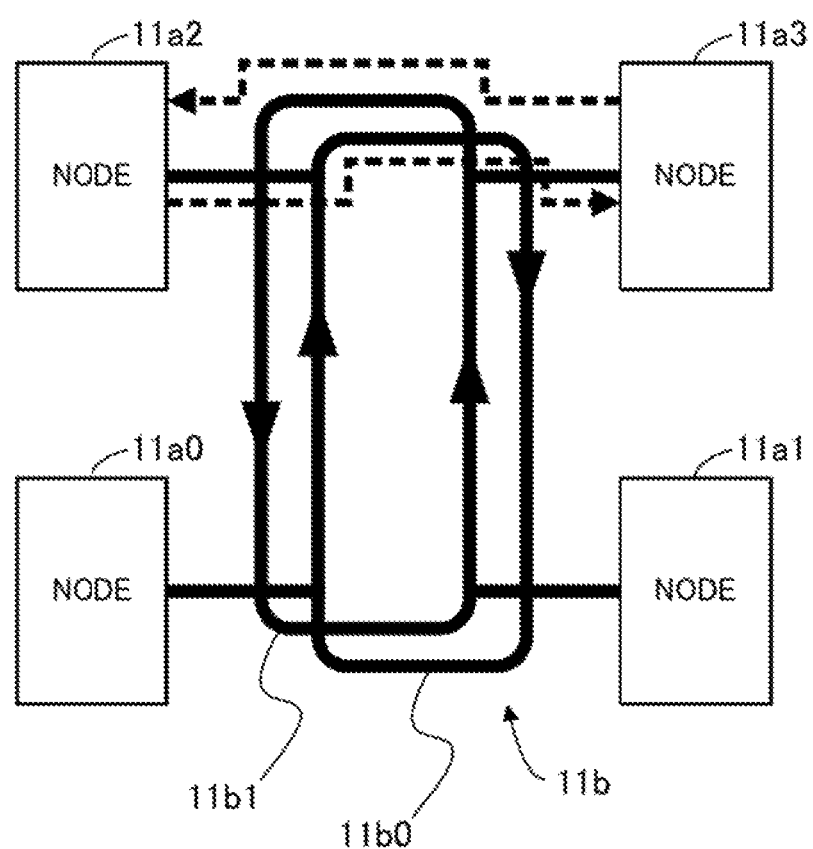
FIG. 4 illustrates an example of communication sessions that do not cause congestion.

FIG. 4 it an example of communication sessions that do not cause congestion.

As described earlier, the ring bus 11b enables communication through the first communication path 11b0 and communication through the second communication path 11b1 without mutual interference. Therefore, for example, when data transmission from the node 11a2 to the node 11a3 and data transmission from the node 11a3 to the node 11a2 are performed at the same time, congestion does not occur in the ring bus 11b.

In the following description, the first and second communication paths 11b0 and 11b1 on the ring bus 11b are occasionally not illustrated.

Figure 5:
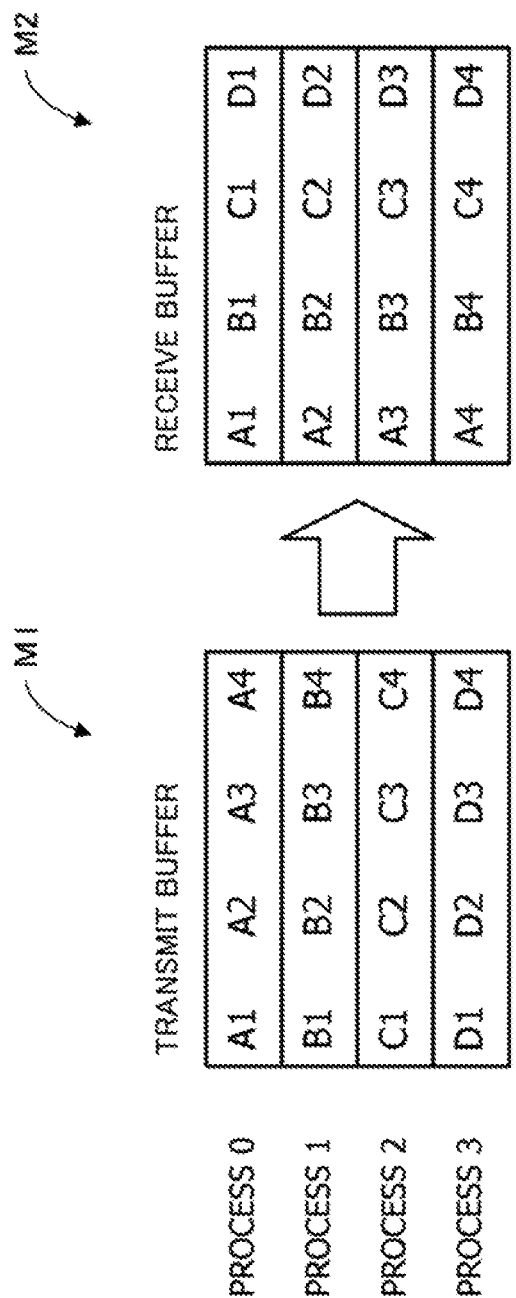
FIG. 5 illustrates an example of collective communication.

FIG. 5 illustrates an example of collective communication.

A communication library such as an MPI library is used for communication between the processes in the information processing apparatus 10. The communication between the processes using the communication library includes collective communication. The collective communication is such that a large number of processes communicate data with each other. For example all-to-all communication in the collective communication is such that every process transmits different data to all then processes, so as to achieve an operation like a transpose operation.

For example, the transmission data of each process (here, "processes 0 to 3") is stored in a row direction in a transmit buffer M1. The transmission data of the "process 0" is data A1, A2, A3, and A4. The transmission data of the "process 1" is data B1, B2, B3, and B4. The transmission data of the "process 2" is data C1, C2, C3, and C4. The transmission data of the "process 3" is data D1, D2, D3, and D4.

As a result of all-to-all communication, the following received data is stored in a receive buffer M2 for the "processes 0 to 3." The received data of the "process 0" is data A1, B1, C1, and D1. The received data of the "process 1" is data A2, B2, C2, and D2. The received data of the "process 2" is data A3, B3, C3, and D3. The received data of the "process 3" is data A4, B4, C4, and D4.

The collective communication is formed of combinations of one-to-one communication sessions. Each process performs a one-to-one communication session as many times as the number of processes, thereby implementing the collective communication. A communication round is repeated as many times as the number of processes in the collective communication, and a step number indicates which round the current communication round is. Note that the total number of steps may be different from the number of processes, depending on an algorithm.

In the one-to-one communication, not only a transmitting process specifics a transmission destination process but also a receiving process may specify a transmission source process. In this case, in the collective communication formed of combinations of one-to-one communication sessions, each process determines a transmission source and a transmission destination in each step and issues communication commands.

For example, in communication under the MPI standard, the identifiers of processes, called rank numbers or ranks, are used for specifying transmission source processes and transmission destination processes. In the case of the MPI standard, a transmitting process and a receiving process call a transmission function and a reception function, respectively, to perform a one-to-one communication session. At this time, the rank number of the transmission destination process is specified to the transmission function, and the rank number of the transmission source process is specified to the reception function.

Alternatively, the following method may be adopted: each process specifies a transmission destination process and one-to-one communication sessions between processes are performed without transmission source processes specified.

Figure 6:
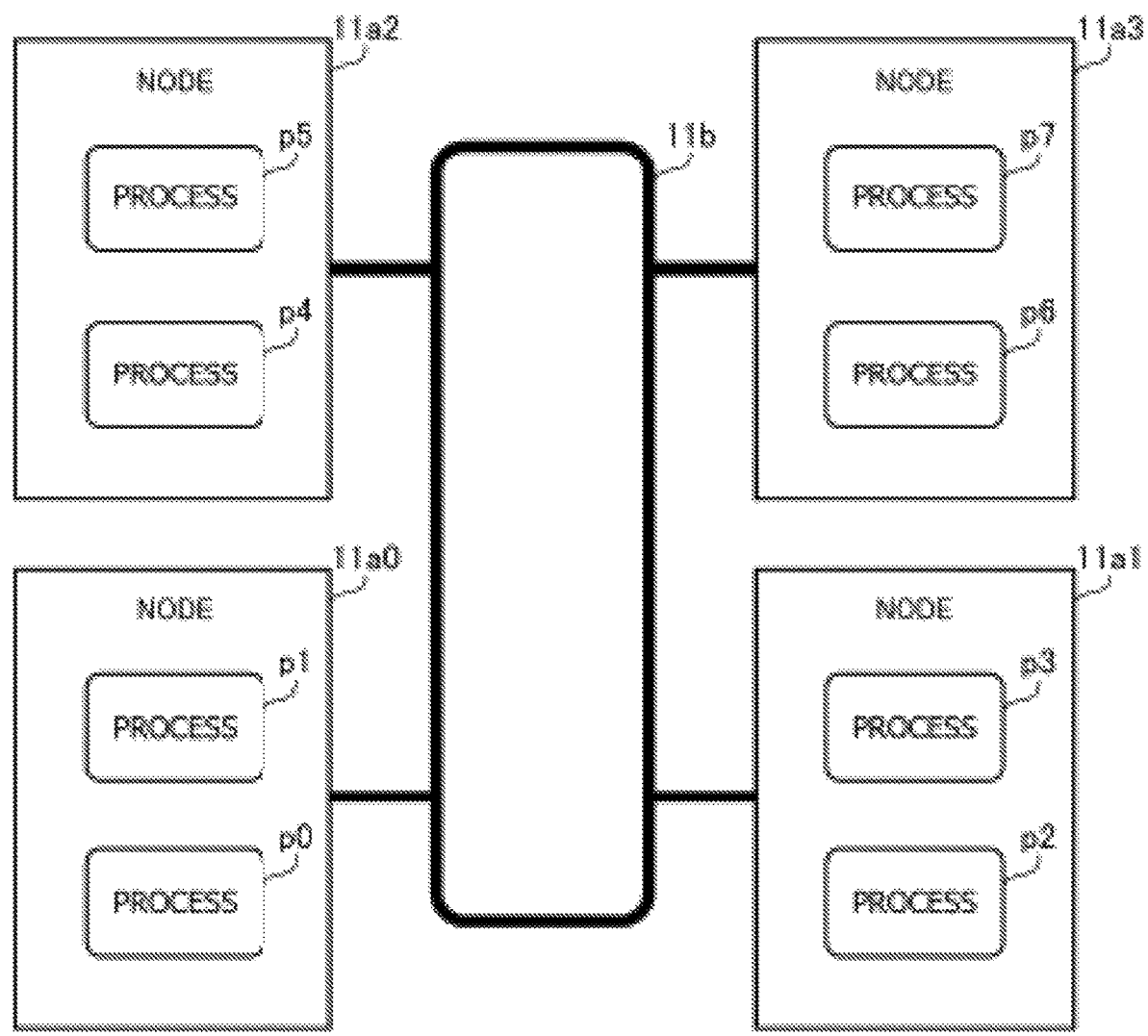
FIG. 6 illustrates an example of processes performed by nodes.

FIG. 6 illustrates an example of processes performed by nodes.

In the second embodiment, each node 11a0 to 11a3 performs two processes in parallel. Therefore, a total of eight processes are performed by the nodes 11a0 to 11a3 in parallel. In this connection as will be described later the number of processes performed by each node in parallel is not limited to two. In addition, some nodes may perform a different number of processes from the other nodes, in parallel.

The node 11a0 performs processes p0 and p1 in parallel. The node 11a1 performs processes p2 and p3 in parallel. The node 11a2 performs processes p4 and p5 in parallel. The node 11a3 performs processes p6 and p7 in parallel.

Figure 7B:
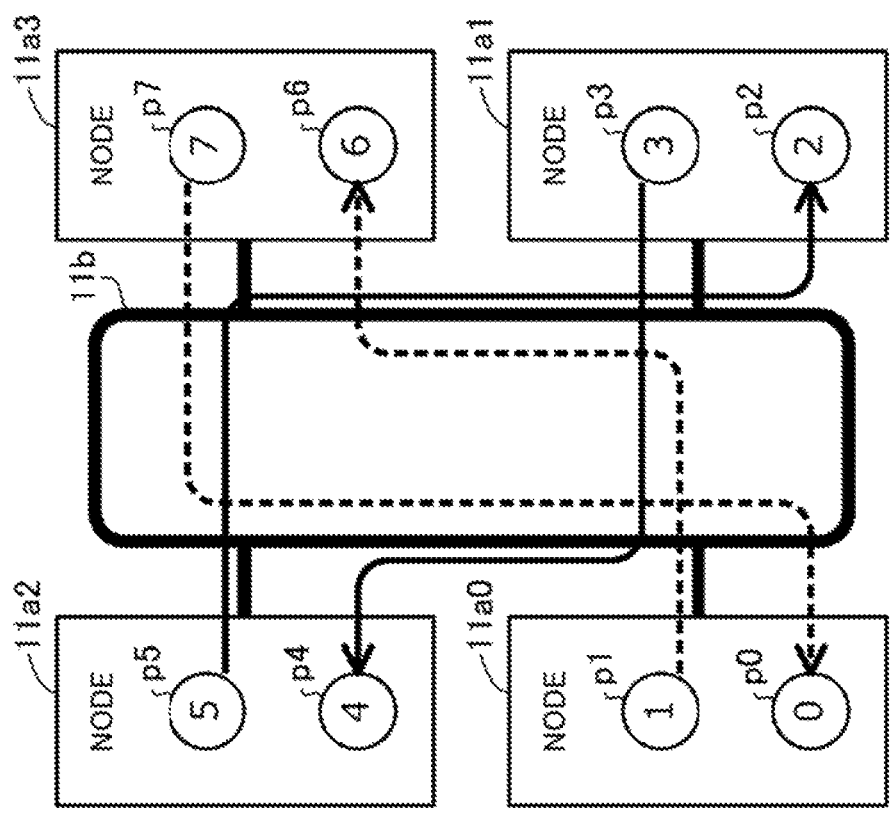
FIGS. 7A and 7B illustrate examples of routing.
Figure 7A:
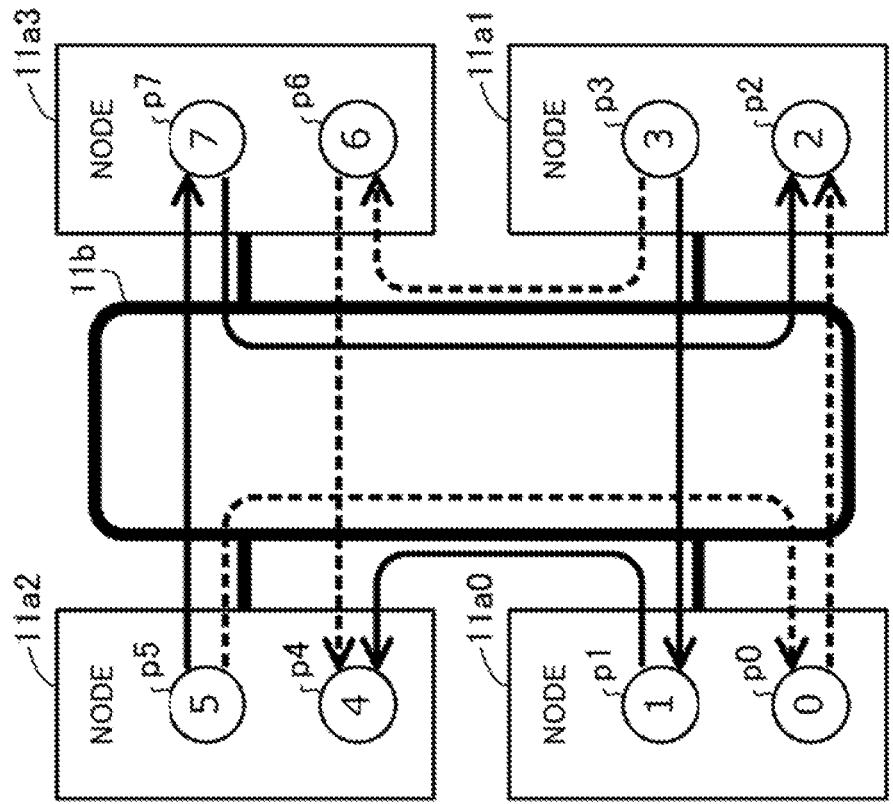

FIGS. 7A and 7B illustrate examples of routing.

Routing in the ring bus 11b is determined based only on a pair of transmission source node and transmission destination node, and is not dynamically changed. The rules for the routing in the ring bus 11b are as follows.

The first rule is that, in the case where a clockwise path and a counterclockwise path differ in the number of hops, a path with a smaller number of hops is used.

The second rule is that, in the case where the tr clockwise path and the counterclockwise path have the same number of hops, the counterclockwise path is used for a pair of nodes 11a0 and 11a3 and the clockwise path is used for a pair of lodes 11a1 and 11a2.

In the drawings, clockwise communication is represented by solid arrows, whereas counterclockwise communication is represented by broken arrows. In addition, processes are represented by circles. A figure in each circle indicates a rank number. As an example, in the description regarding FIGS. 7A to 12, it is assumed that rank numbers "0" to "7" are previously assigned to the processes p0 to p7, respectively, by a user or prescribed soft ware.

FIG. 7A illustrate a first example of routing.

In FIG. 7A, a shortest path is used for communication between adjacent nodes. The communication between adjacent nodes may be, for example, communication between the nodes 11a1 and 11a3, communication between the nodes 11a0 and 11a2, communication between the nodes 11a0 and 11a1, and communication between the nodes 11a2 and 11a3.

FIG. 7B illustrates a second example of routing.

In FIG. 7B, communication between the nodes 11a0 and 11a3 and communication between the nodes 11a1 and 11a2 each have two hops in both the clockwise path and the counterclockwise path. In this case, the clockwise path (first communication path 11b0) is used for the communication between the nodes 11a1 and 11a2. In addition, the counterclockwise path (second communication path 11b1) is used for the communication between the nodes 11a0 and 11a3.

Figure 8B:
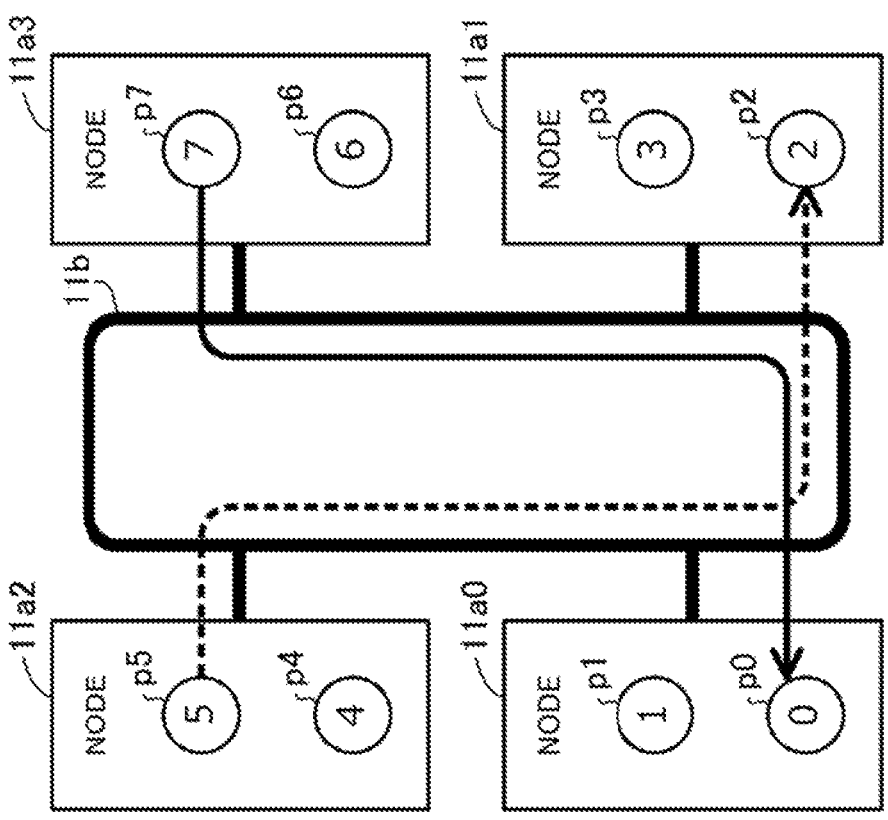
FIGS. 8A and 8B illustrate examples of routing that does not occur.
Figure 8A:
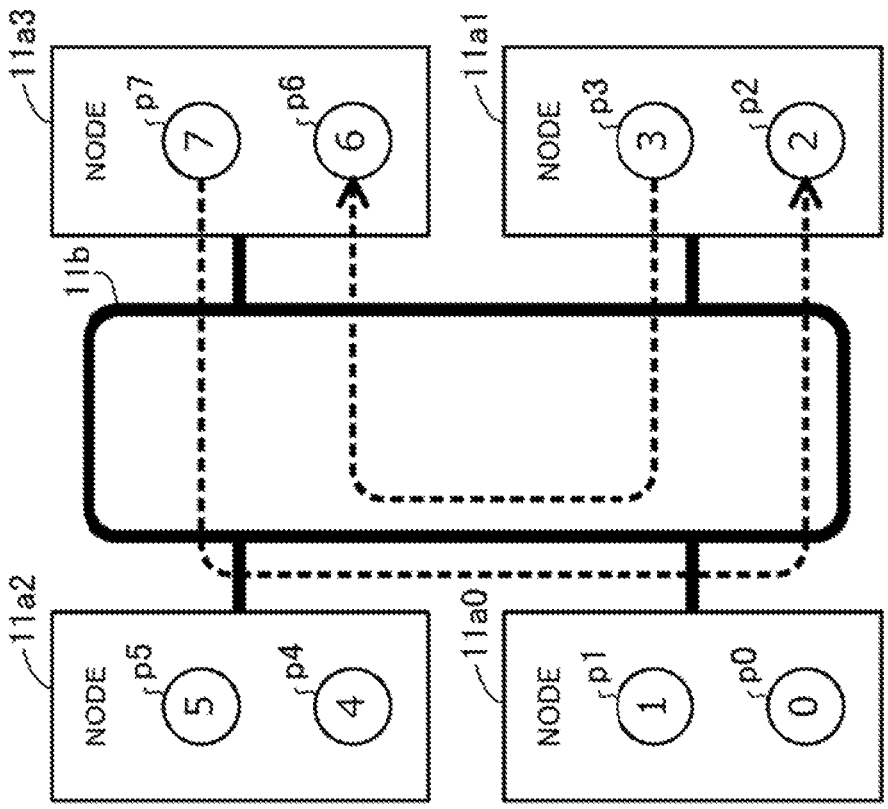

FIGS. 8A and 8B illustrate examples of routing that does not occur.

FIG. 8A illustrates a first example of routing that does not occur.

The routing illustrated in FIG. 8A does not use the shortest path for communication between the adjacent nodes 11a1 and 11a3, which is against the first rule for the routing described with reference to FIGS. 7A and 7B. Therefore, the routing in FIG. 8A does not occur in the ring bus 11b.

FIG. 8B illustrates a second example of routing does not occur.

The routing illustrated in FIG. 8B uses the clockwise path for communication between the nodes 11a0 and 11a3 and the counterclockwise path for communication between the nodes 11a1 and 11a2, which is against the second rule for the routing described with reference to FIGS. 7A and 7B. Therefore, the routing of FIG. 8B does not occur in the ring bus 11b.

Figure 9A:
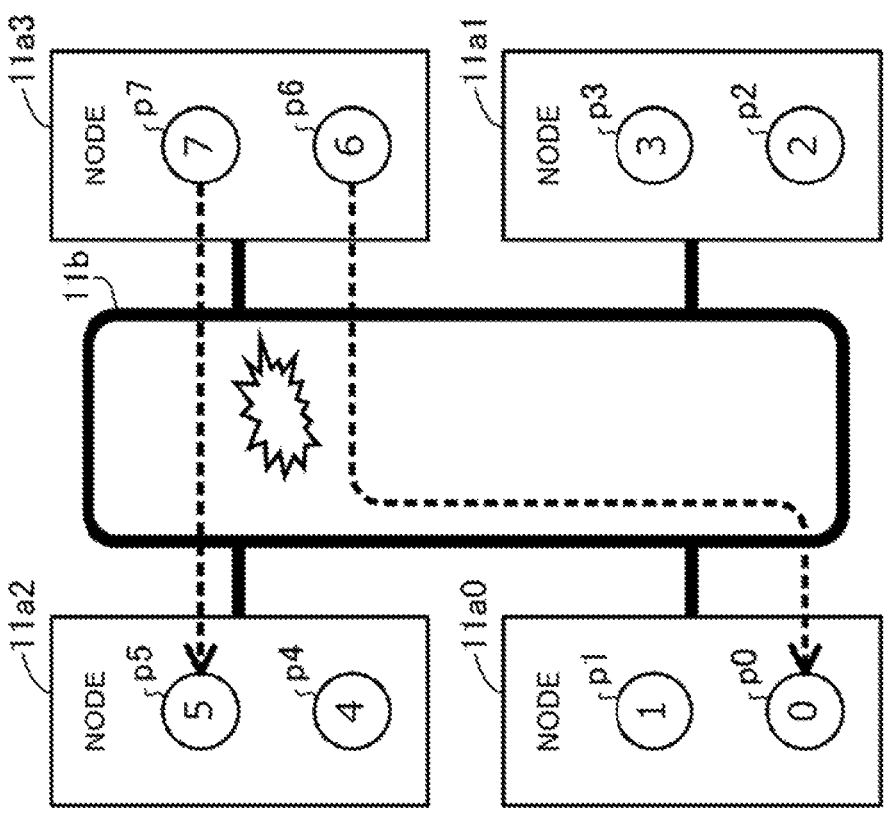
FIGS. 9A and 9B illustrate examples of a communication pattern that causes congestion.
Figure 9B:
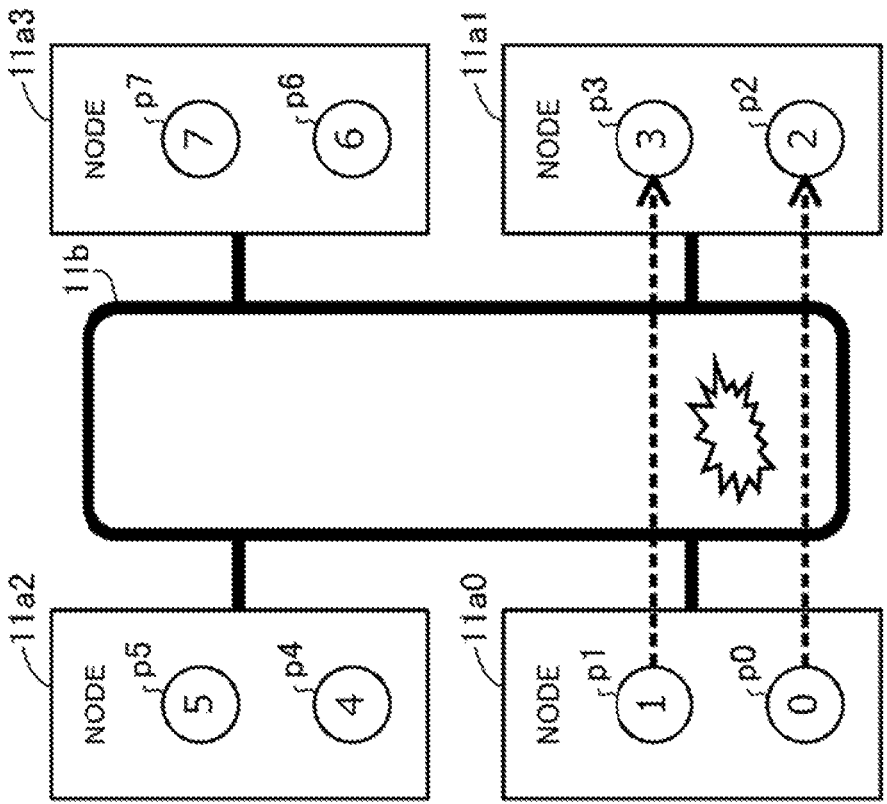

FIGS. 9A and 9B illustrate examples of a communication pattern that causes congestion.

FIG. 9A illustrates a first example of a communication pattern that causes congestion.

In the example of FIG. 9A, communication from the process p0 to the process p2 and communication from the process p1 to the process p3 share a part of the counterclockwise path. In this case, congestion occurs in the zone between the node 11a0 and the node 11a1 in the second communication path 11b1 of the ring bus 11b.

FIG. 9B illustrates a second example of a communication pattern that causes congestion.

In the example of FIG. 9B, communication from the process p6 to the process p0 and communication from the process p7 to the process p5 share a part of the counterclockwise path. In this case, congestion occurs in the zone between the node 11a2 and the node 11a3 in the second communication path 11b1 of the ring bus 11b.

Figure 10A:
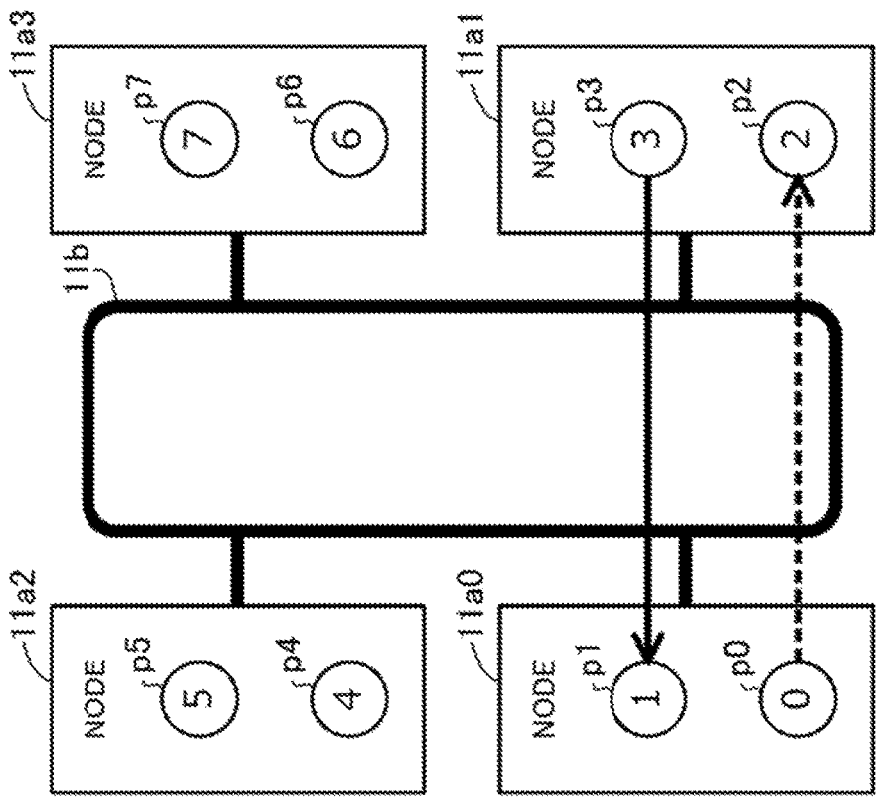
FIGS. 10A and 10B illustrate examples of a communication pattern that does not cause congestion.
Figure 10B:
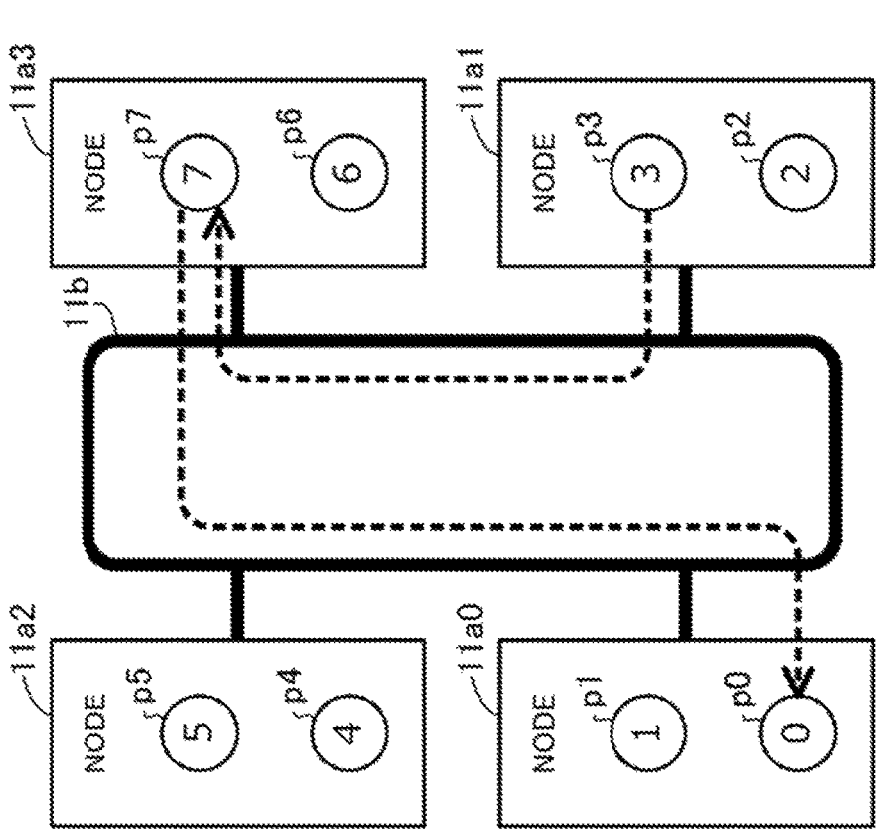

FIGS. 10A and 10B illustrate examples of a communication pattern that does not cause congestion.

FIG. 10A illustrates a first example of a communication pattern that does not cause congestion.

In the example of FIG. 10A, counterclockwise communication from the process p0 to the process p2 and clockwise communication from the process p3 to the process p1 are performed. Here, these communication sessions do not share the same path on the ring bus 11b. That is, the counterclockwise communication from the process p0 to the process p2 uses the second communication path 11b1, and the clockwise communication from the process p3 to the process p1 uses the first communication path 11b0. Since clockwise communication and counterclockwise communication do not interfere with each other, the communication pattern of FIG. 10A does not cause congestion.

FIG. 10B illustrates a second example of a communication pattern that does not cause congestion.

In the example of FIG. 10B, counterclockwise communication from the process p3 to the process p7 and counterclockwise communication from the process p7 to the process p0 are performed. Here, these communication sessions do not share any part of the counterclockwise path on the ring bus 11b. In this connection, these communication sessions share the path (connection bus 11c3) between the node 11a3 and the ring bus 11b. However, as described earlier, congestion does not occur even when the connection bus 11c3 is shared. Therefore, the communication pattern of FIG. 10B does not cause congestion.

Figure 11:
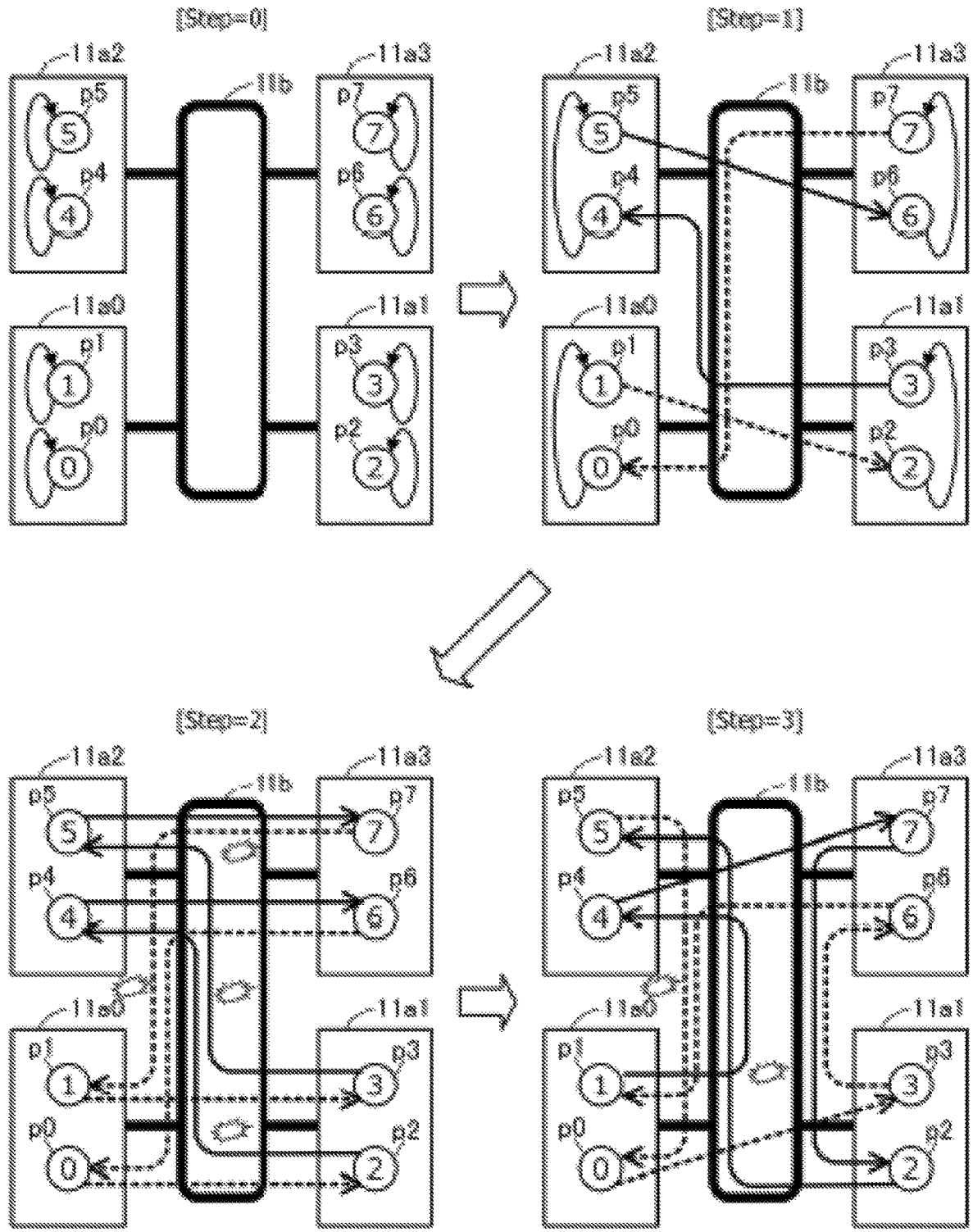
FIG. 11 illustrates an example of all-to-all communication that causes a lot of congestion.

FIG. 11 illustrates an example of all-to-all communication that causes a lot of congestion.

Examples of all-to-all communication based on the rank numbers of the processes exemplified in FIG. 7 will be described with reference to FIGS. 11 and 12. In the examples, communication partners are determined using the rank numbers according to a simple algorithm. According to this algorithm, each process adds a step number to the own rank number, divides the addition result by eight, and takes the remainder as the rank number of a data transmission destination. The step number in the all-to-all communication is denoted by "Step." Step is incremented one by one from zero.

In the drawings, congestion occurs in a zone through which two or more solid arrows corresponding to clockwise communication pass and in a zone through which two or more broken arrows corresponding to counterclockwise communication pass, in the ring bus 11b.

In this example, congestion occurs in Step=2 and 3 out of Step=0 to 3 in FIG. 11. In Step=2, congestion occurs at the following locations. The first location is a part of the counterclockwise path from the node 11a1 to the node 11a0. The second location is a part of the counterclockwise path from the node 11a0 to the node 11a1. The third location is a part of the clockwise path from the node to the node 11a2. The fourth location is a part of the clockwise path from the node 11a2 to the node 11a3.

In Step=3, congestion occurs at the following locations. The first location is a part of the counterclockwise path from the node 11a2 to the node 11a0. The second location is a part of the clockwise path from the node 11a0 to the node 11a2.

Step=3 is followed by Step 4.

Figure 12:
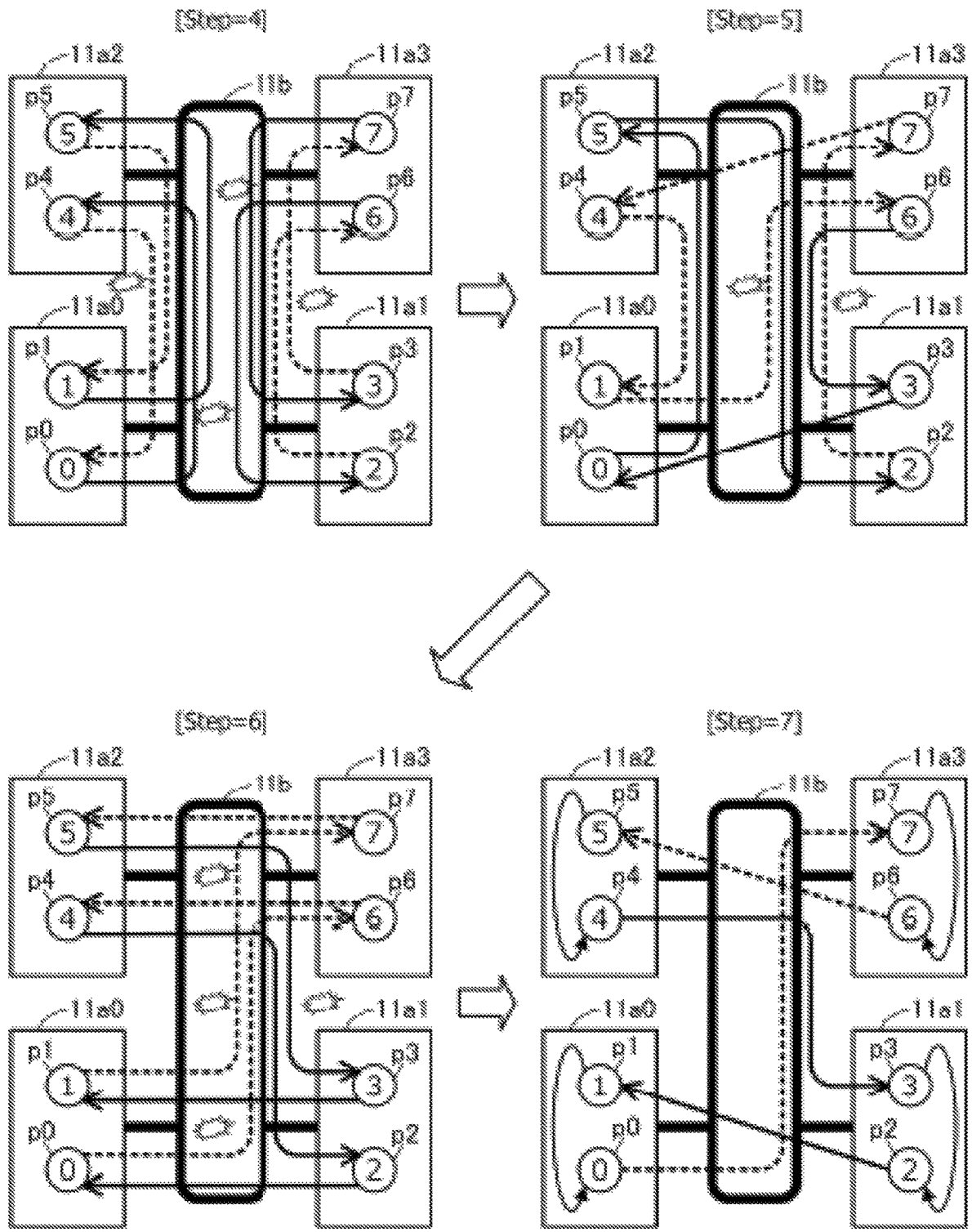
FIG. 12 illustrates an example of all-to-all communication that causes a lot of congestion.

FIG. 12 illustrates an example of all-to-all communication that causes a lot of congestion.

In this example, congestion occurs in Step=4 to 6 out of Step=4 to 7 illustrated in FIG. 12. In Step=4, congestion occurs at the following locations. The first location is a part of the counterclockwise path from the node 11a2 to the node 11a0. The second location is a part of the counterclockwise path from the node 11a1 to the node 11a3. The third location is a part of the clockwise path from the node 11a0 to the node 11a2. The fourth location is a part of the clockwise path from the node 11a3 to the node 11a1.

In Step=5, congestion occurs at the following locations. The first location is a part of the counterclockwise path from the node 11a1 to the node 11a3. The second location is a part of the clockwise path from the node 11a3 to the node 11a1.

In Step=6, congestion occurs at the following locations. The first location is a part of the counterclockwise path from the node 11a3 to the node 11a2. The second location is a part of the counterclockwise path from the node 11a0 to the node 11a3. The third location is a part of the clockwise path from the node 11a2 to the node 11a1. The fourth location is a part of the clockwise path from the node 11a1 to the node 11a0.

As exemplified in FIGS. 11 and 12, a lot of congestion may occur if all-to-all communication is performed using the rank numbers previously assigned by a user or another. To reduce the occurrence of congestion, the nodes 11a0 to 11a3 provide a function of performing all-to-all communication using virtual rank numbers that are determined based on the hardware configuration of the CPU 11, not based on the previously assigned rank numbers.

A procedure for performing all-to-all communication in the information processing apparatus 10 is divided into the following two phases. The first phase is to assign virtual rank numbers. The second phase is to perform the all-to-all communication. With respect to the assignment virtual rank numbers, virtual rank numbers, which are different from rank numbers previously assigned by a user or another, are assigned at the initialization of the CPU 11 or at the start of the all-to-all communication. The virtual rank numbers are used as identifiers for performing the all-to-all communication. That is, in one-to-one communication sessions that form the all-to-all communication, a transmitting process specifies the virtual rank number of its transmission destination process to a transmission function when calling the transmission function. In addition, a receiving process may specify the virtual rank number of its transmission source process to a reception function when calling the reception function.

The following describes an example of a procedure of all-to-all communication in the information processing apparatus 10.

Figure 13:
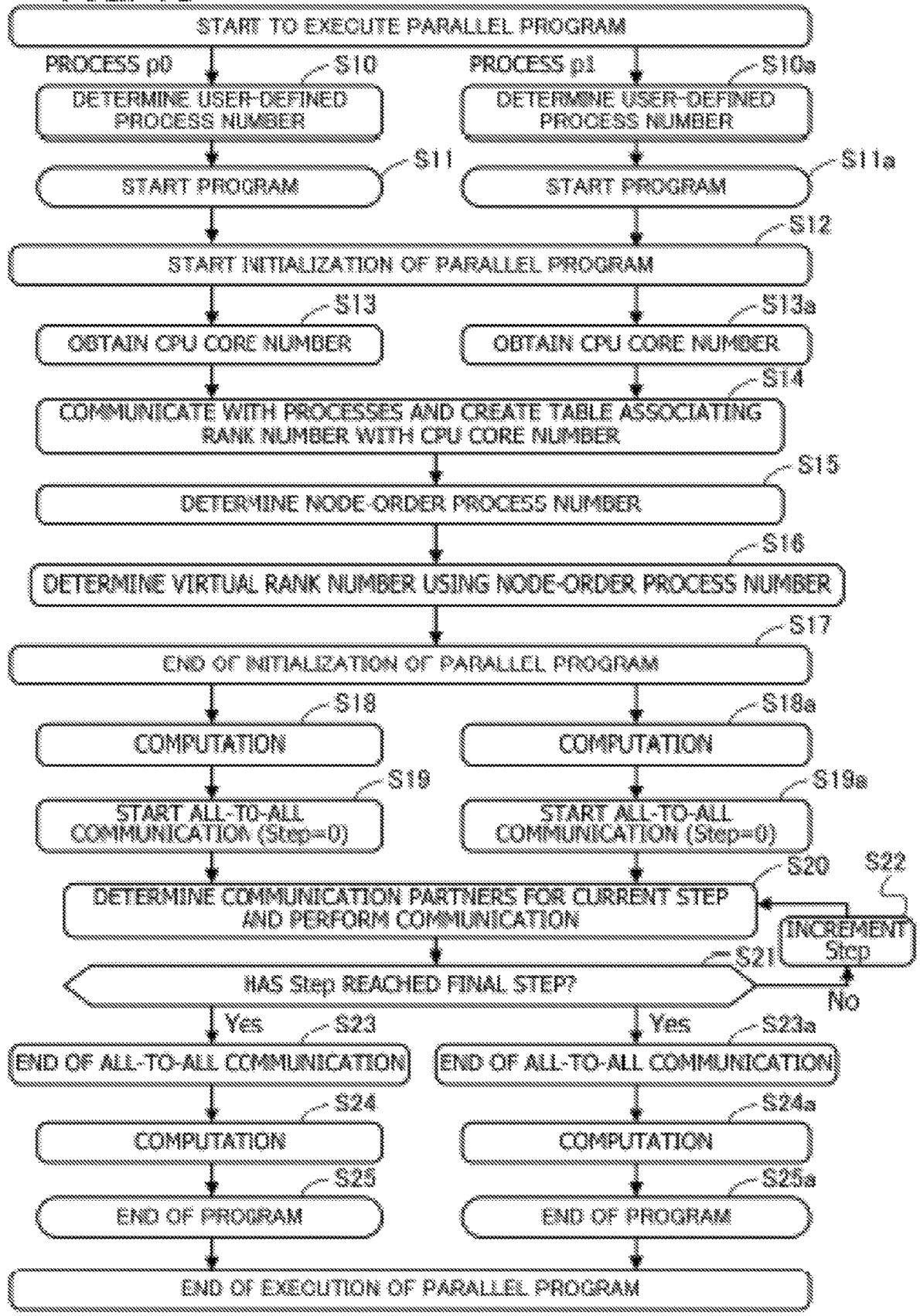
FIG. 13 is a flowchart illustrating an example of how an information processing apparatus operates.

FIG. 13 is a flowchart illustrating an example of how an information processing apparatus operates.

FIG. 13 focuses on the processes p0 and p1 of the node 11a0. Note that the other processes in the nodes 11a1, 11a2, and 11a3 execute their activities in parallel in the same way. In addition, in FIG. 13, an activity of the process p1 corresponding to an activity of the process p0 is identified by addition of a letter "a" at the end of the reference numeral of the activity of the process p0, like "S10a" of the process p1 corresponding to "S10" of the process p0. The activity of each step executed by the process p1 is the same as that by the process p0, and therefore the explanation thereof is omitted. The following S10 begins when the information processing apparatus 10 starts to execute a parallel program. The processes p0 to p7 of the parallel program are initiated in response to the start of the execution of the parallel program.

(S10) The process p0 determines a user-defined process number. The user-defined process number corresponds to a rank number previously assigned by a user or another.

(S11) The process p0 starts to execute a program.

(S12) The process p0 starts initialization of the parallel program. The initialization includes the following S13 to S16.

(S13) The process p0 obtains a CPU core number with reference to hardware information previously stored in the memory 12.

(S14) The process p0 communicates with the other processes, creates table data (named a rank number table) associating the rank numbers of the processes with CPU core numbers, and stores the rank number table in the memory 12.

(S15) The process p0 determines the node order process number of each process. The node-order process numbers in ascending order starting with zero are assigned to the processes executed by each node in ascending order of node number. The hardware information stored in the memory 12 includes information (CPU core number table) associating node numbers with CPU core numbers. Therefore, the process p0 confirms the order of node numbers corresponding to the process with reference to the CPU core number table and the rank number table created at S14. For example, the process p0 may create a node-order process number table containing the determined node-order process numbers and store the node-order process number table in the memory 12.

(S16) The process p0 determines a virtual rank number using a node-order process number. Taking the node-order process number as Num and the virtual rank number as Vrank, the virtual rank number Vrank corresponding to the no order process number Num is represented by the equation (1). The equation (1) is reproduced below.

$$V\text{rank} = (\text{Num} \% 2 == 0\ ?\ \text{Num}: \text{Size} - \text{Num}) \quad (1)$$

In the example of the second embodiment. Size=8. For example, the process p0 may create a virtual rank number table containing the determined virtual rank numbers and store the created virtual rank number table in the memory 12.

(S17) The process p0 completes the initialization of the parallel program.

(S18) The process p0 executes prescribed computation defined by the user.

(S19) The process p0 starts all-to-all communication. The process p0 sets step number to Step=0.

(S20) The process p0 determines its communication partner processes for the current step number Step on the basis of the virtual rank number of the process p0 and performs communication. The communication partner processes refer to a process to which the process p0 transmits data and a process from which the process p0 receives data. With respect to a process with virtual rank number Vrank, the node-order process number Num_d of its data transmission destination process is represented by the equation (2). The equation (2) is reproduced below.

$$Num\_d = Step \wedge Vrank \quad (2)$$

Here, "^" denotes an exclusive OR operation between the binary values on both sides thereof. The process p0 computes the virtual rank number of its data transmission destination process from the process p0 by substituting Num_d for Num in the equation (1).

In addition, with respect to a process with virtual rank number the node-order process number Num_s of its at a transmission source process is represented the equation (3). The equation (3) is reproduced below.

$$Num\_s = (Step \% 2 == 0 \text{ ? } Step: Maxstep - Step) \wedge Vrank \quad (3)$$

In the example of the second embodiment, Size=8 and Maxstep=8.

The process p0 computes the virtual rank number of its data transmission source process by substituting Num_s for Num in the equation (1).

(S21) The process p0 determines whether Step has reached the final step. In the example of the second embodiment, Step=7 indicates the final step. If the final step is reached, the procedure goes to S23. Otherwise, the procedure goes to S22.

(S22) The process p0 adds one to Step. That the process p0 increments the step number. Then, the procedure goes to S20.

(S23) The process p0 comp es the all-to-all communication.

(S24) The process p0 executes prescribed computation defined by the user.

(S25) The process p0 completes the execution of the program. The other processes complete the execution as well. As a result, the execution of the parallel program is now complete.

As described above, the processes p0 to p7 perform the all-to-all communication based on the virtual rank numbers. In S20, the CPU 11 determines the data transmission destination process of each process for the current step performing the exclusive OR operation of the equation (2) using the virtual rank number of the process and the step number. In addition, the CPU 11 determines data transmission source process of each process for the current step by performing the exclusive OR operation of the equation (3) using the virtual rank number of the process and the step number. The CPU 11 performs data transmission from each process to data transmission destination process and data reception of each process from its data transmission source process.

The processes p0 to p7 may perform the all-to-all communication again after S24 and S24a. For example, the processes p0 to p7 may repeatedly execute activities corresponding to S18 to S23 plural times.

In addition, the completion of one-to-one communication sessions between the processes in S20 is synchronized by the processes communicating a prescribed notification with each other at every step in the all-to-all communication, for example. After the synchronization is performed, the CPU 11 increments the step number. The CPU 11 may perform the synchronization every plural steps in the all-to-all communication. In addition, it is considered that the time needed to perform a one-to-one communication session between processes may be approximately the same among pairs processes performing the communication sessions. In this case, when a pair of processes completes a one-to-one communication seas the other pairs of processes are expected to complete their one-to-one communication sessions as well. Therefore the CPU 11 may omit the synchronization of the completion of one-to-one communication sessions between the processes. In this case, for example, each process increments the step number at the completion of a one-to-one communication session and advances to the next step.

FIGS. 14A and 14B illustrate examples of data structures.

FIG. 14A illustrates a CPU core number table 121. The CPU core number table 121 is hardware information indicating correspondence between the node numbers of nodes and the CPU core numbers of cores included in the nodes. Each CPU core number is an identification number uniquely assigned to one of the cores provided in the CPU. The CPU core number table 121 is previously stored in the memories 12, 13, 14, and 15. In this connection, the CPU core number table 121 may be stored in advance in a memory accessible to the nodes 11a0 to 11a3, not in the memories 12, 13, 14, and 15.

The CPU core number table 121 has the following columns: Node Number and CPU Core Number. The Node Number column contains the node number of a node. The CPU Core Number column contains the CPU core number of a core provided in the node.

For example, the CPU core number table 121 has information with a node number of "0" and a CPU core number of "0." This information means that a node with node number "0" locally has a core with CPU core number "0."

FIG. 14B illustrates a rank number table 122. The rank number table 122 is created in the activity corresponding to 214. The rank number table has the following columns: CPU Core Number and Rank Number. The CPU Core Number column contains a CPU number. The Rank Number column contains a rank number previously assigned by a user or another to a process that is performed by the core with corresponding CPU core number. The rank number corresponds to a user-refined process number.

For example, the rank number table 122 includes information with a CPU core number of "0" and a rank number of "2." This information means that the core with CPU core number "0" is used to perform a process with rank number "2." For example, in the case where one process is performed by a plurality of cores, the rank number of the process is associated with their CPU core numbers.

As illustrated in the CPU core number table 121, the hardware information stored in the memories 12, 13, 14, and 15 includes the node numbers of a plurality of nodes that perform a plurality of processes and the core numbers of the plurality of cores included in each node. The CPU 11 obtains the core numbers of cores each assigned any of a plurality of processes and generates the node-order process numbers of processes assigned to the cores in the order of node numbers corresponding to the core numbers, on the basis of the hardware information.

FIGS. 15A and 15B illustrate examples of data structures.

FIG. 15A illustrates a node-order process number table 123. The node-order process number table 123 has the following columns: CPU Core Number and Node-Order Process Number. The CPU Core Number column contains a CPU core number. The Node-Order Process Number column contains the node-order process number of a process that is performed by the core with corresponding CPU core number.

For example, the node-order process number table 123 contains information with a CPU core number of "0" and a node-order process number of "0." This information means that the node-order process number of a process that is performed by a core with CPU core number "0" is "0." For example, in the case where one process is performed by a plurality of cores, the node-order process number of the process is associated with their CPU core numbers.

FIG. 15B illustrates a virtual rank number table 124. The virtual rank number table 124 has the following columns: CPU Core Number and Virtual Rank Number. The CPU Core Number column contains a CPU core number. The Virtual Rank Number column contains the virtual rank number of a process that is performed by a core with corresponding CPU core number.

For example, the virtual rank number table 124 contains information with a CPU core number of "0" and a virtual rank number of "0." This information means that the virtual rank number of a process that is performed by a core with CPU core number "0" is "0." For example, in the case where one process is performed by a plurality of cores, the virtual rank number of the process is associated with their CPU core numbers.

Figure 16:
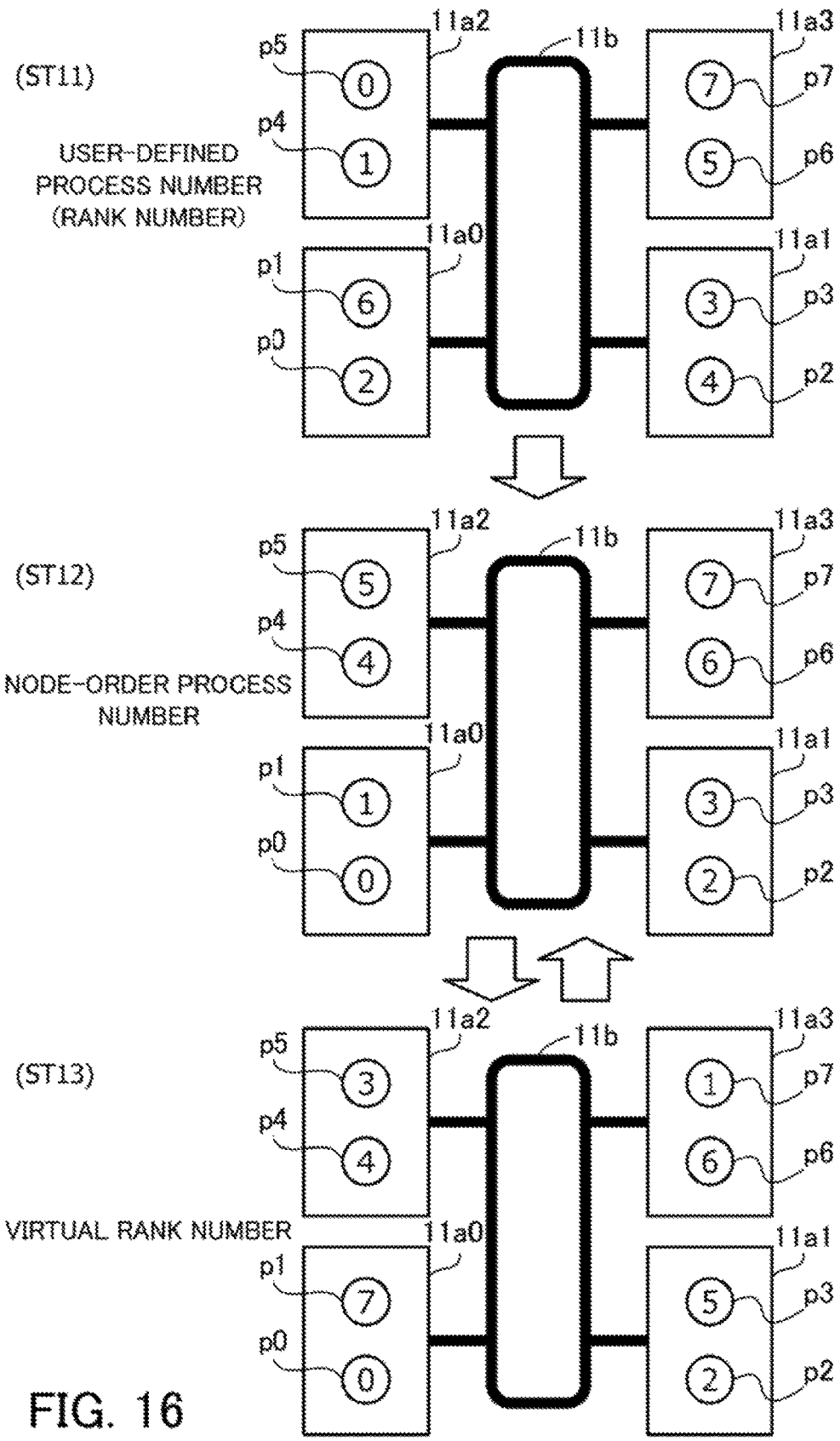
FIG. 16 illustrates an example of how to determine virtual rank numbers.

FIG. 16 illustrates an example of how to determine virtual rank numbers.

The processes p0 to p7 assign previously-designated user-defined process numbers to the processes p0 to p7 (ST11). For example, the process p0 is assigned a user-defined process number "2." The process p1 is assigned a user-defined process number "6." The process p2 is assigned a user-defined process number "4." The process p3 is assigned a user-defined process number "3." The process p4 is assigned a user-defined process number "1." The process p5 is assigned a user-defined process number "0." The process p6 is assigned a user-defined process number "5." The process p7 is assigned a user-defined process number "7." The user-defined process numbers correspond to the rank numbers previously assigned by a user or another.

The processes p0 to p7 determine the node-order process numbers of the processes p0 to p7 with reference to the CPU core number table 121 and rank number table 122 (ST12). The node-order process numbers in ascending order starting with zero are assigned to the processes in ascending order from a process belonging to a node with the smallest node number, with reference to the CPU core number table 121. In the case where one node performs a plurality of processes, the node-order process numbers are assigned to the plurality of processes in a certain order. For example, the node-order process numbers may be assigned in order of CPU core number.

The process p0 is assigned a node-order process number "0." The process p1 is assigned a node-order process number "1." The process p2 is assigned a node-order process number "2." The process p3 is assigned a node-order process number "3." The process p4 is assigned a node-order process number "4." The process p5 is assigned a node-order process number "5." The process p6 is assigned a node-order process number "6." The process p7 is assigned a node-order process number "7."

The processes p0 to p7 determine the virtual rank number of each process p0 to p7 with the equation (1) using the node-order process number of the process p0 to p7 (ST13). The virtual rank number of the process p0 is "0." The virtual rank number of the process p1 is "7." The virtual rank number of the process p2 is "2." The virtual rank number of the process p3 is "5." The virtual rank number of the process p4 is "4." The virtual rank number of the process p5 is "3." The virtual rank number of the process p6 is "6." The virtual rank number of the process p7 is "1."

Here, each process p0 to p7 is able to obtain the node-order process number of its data transmission destination process with the equation (2) using the virtual rank number of the own process as an input. In addition, each process p0 to p7 is able to obtain the node-order process number of its data transmission source process with the equation (3) using the virtual rank number of the own process as an input.

The use of the virtual rank numbers in addition to the node-order process numbers makes simple both the equation (2) to obtain a transmission destination process and the equation (3) to obtain a transmission source process, thereby simplifying the computation.

FIG. 17 illustrates an example of computing the virtual rank number of a transmission destination.

A table 125 represents an example of computing the virtual rank number of a data transmission destination process with respect to the process p1 with virtual rank number in each step of all-to-all communication.

In Step=0, the node-order process number of the data transmission destination process computed with the equation (2) is "0^7=7." Therefore, the virtual rank number of the data transmission destination process computed with the equation (1) is "1."

In Step=1, the node-order process number of the data transmission destination process is "1^7=6." Therefore, the virtual rank number of the data transmission destination process is "6."

In Step=2, the node-order process number of the data transmission destination process is "2^7=5." Therefore, the virtual rank number of the data transmission destination process is "3."

In Step=3, the node-order process number of the data transmission destination process is "3^7=4." Therefore, the virtual rank number of the data transmission destination process is "4."

In Step=4, the node-order process number of the data transmission destination process is "4^7=3." Therefore, the virtual rank number of the data transmission destination process is "5."

In Step=5, the node-order process number of the data transmission destination process is "5^7=2." Therefore, the virtual rank number of the data transmission destination process is "2."

In Step=6, the node-order process number of the data transmission destination process is "6^7=1." Therefore, the virtual rank number of the data transmission destination process is "7."

In Step=7, the node-order process number of a data transmission destination process is "7^7=0." Therefore, the virtual rank number of the data transmission destination process is "0."

FIG. 18 illustrates an example of computing the virtual rank number of a transmission source.

A table 126 represents an example of computing the virtual rank number of a data transmission source with respect to the process p1 with virtual rank number "7" in each step of all-to-all communication.

The table 126 contains a step evaluation vale e in addition to the columns of the table 125. A step evaluation value represents an item in the parentheses of the equation (3), that is, a result of computing (Step % 2==0? Step Maxstep−Step).

In Step=0, the step evaluation value is "0." In this case, the node order process number of the data transmission source process computed with the equation (3) is "0^7=7." Therefore, the virtual rank number of the data transmission source process computed with the equation (1) is "1."

In Step=1, the step evaluation value is "7." In this case, the node-order process number of the data transmission source process is "7^7=0." Therefore, the virtual rank number of the data transmission source process is "0."

In Step=2, the step evaluation value is "2." In this case, the node-order process number of the data transmission source process is "2^7=5." Therefore, the virtual rank number of the data transmission source process is "3."

In Step=3, the step evaluation value is "5." In this case, the node-order process number of the data transmission source process is "5^7=2." Therefore, the virtual rank number of the data transmission source process is "2."

In Step=4, the step evaluation value is "4." In this case, the node-order process number of the data transmission source process is "4^7=3." Therefore, the virtual rank number of the data transmission source process is "5."

In Step=5, the step evaluation value is "3." In this case, the node-order process number of the data transmission source process is "3^7=4." Therefore, the virtual rank number of the data transmission source process is "4."

In Step=6, the step evaluation value is "6." In this case, the node-order process number of the data transmission source process is "6^7=1." Therefore, the virtual rank number of the data transmission source process is "7."

In Step=7, the step evaluation value is "1." In this case, the node-order process number of the data transmission source process is "1^7=6." Therefore, the virtual rank number of the data transmission source process is "6."

Figure 19:
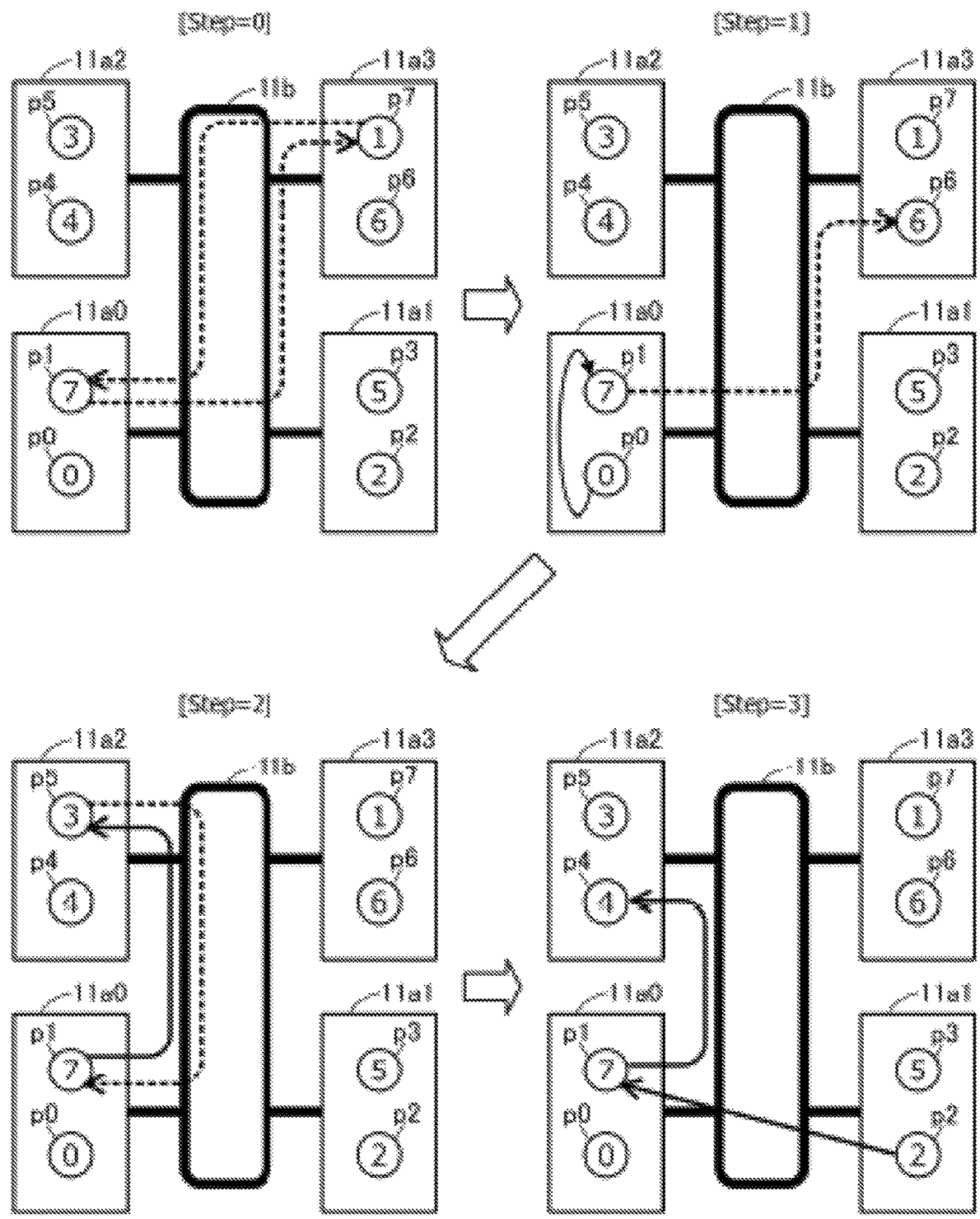
FIG. 19 illustrates an example of all communication based on virtual rank numbers.

FIG. 19 illustrates an example of all-to-all communication based on virtual rank numbers.

Figure 20:
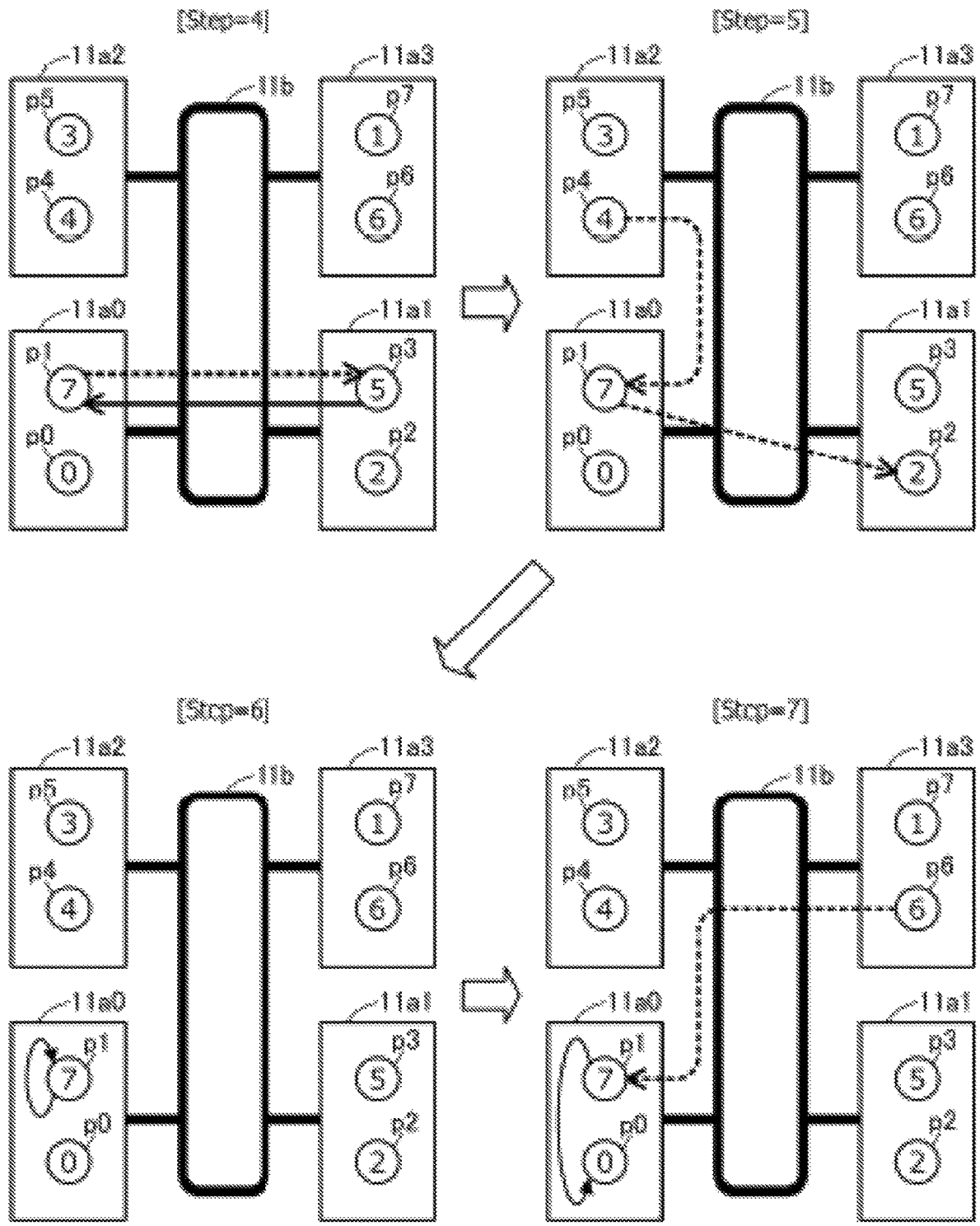
FIG. 20 illustrates an example of all-to-all communication based on virtual rank numbers.

With respect to the process p1 (virtual rank number "7"). FIGS. 19 and 20 exemplify communication sessions in which the process p1 is a transmission source or a transmission destination. The value in each circle representing one of the processes p0 to p7 indicates the virtual rank number of the process.

In Step=0, the process p1 transmits data to the process p7 through a counterclockwise path. The process p7 receives the data from the process p1. In addition, the process p7 transmits data to the process p1 through the counterclockwise path. The process p1 receives the data from the process p7.

In Step=1, the process p1 transmits data to the process p6 through the counterclockwise path. The process p6 receives the data from the process p1. In addition, the process p0 transmits data to the process p1. The process p1 receives the data from the process p0. Communication within the same node does not use the ring bus 11b.

In Step=2, the process p1 transmits data to the process p5 through a clockwise path. The process p5 receives the data from the process p1. In addition, the process p5 transmits data to the process p1 through the counterclockwise path. The process p1 receives the data from the process p5.

In Step=3, the process p1 transmits data to the process p4 through the clockwise path. The process p4 receives the data from the process p1. In addition, the process p2 transmits data to the process p1 through the clockwise path. The process p1 receives the data from the process p2.

FIG. 20 illustrates an example of all-to-all communication based on virtual rank numbers.

In Step=4, the process p1 transmits data to the process p3 through the counterclockwise path. The process p3 receives the data from the process p1. In addition, the process transmits data to the process p1 through the clockwise path. The process p1 receives the data from the process p3.

In Step=5, the process p1 transmits data to the process p2 through the counterclockwise path. The process p2 receives the data from the process p1. In addition, the process p4 transmits data to the process p1 through the counterclockwise path. The process p1 receives the data from the process p4.

In Step=6, the process p1 transmits data to the process p1. The process p1 receives the data from the process p1. For example, the data transmission from the process p1 to the process p1 means transferring the data stored in the transmit buffer of the process p1 to the receive buffer thereof.

In Step=7, the process p1 transmits data to the process p0. The process p0 receives the data from the process p1. In addition, the process p6 trans its data to the process p1 through the counterclockwise path. The process p1 receives the data from the process p6.

The following exemplifies communication of all processes p0 to p7 in each step of all-to-all communication.

Figure 21:
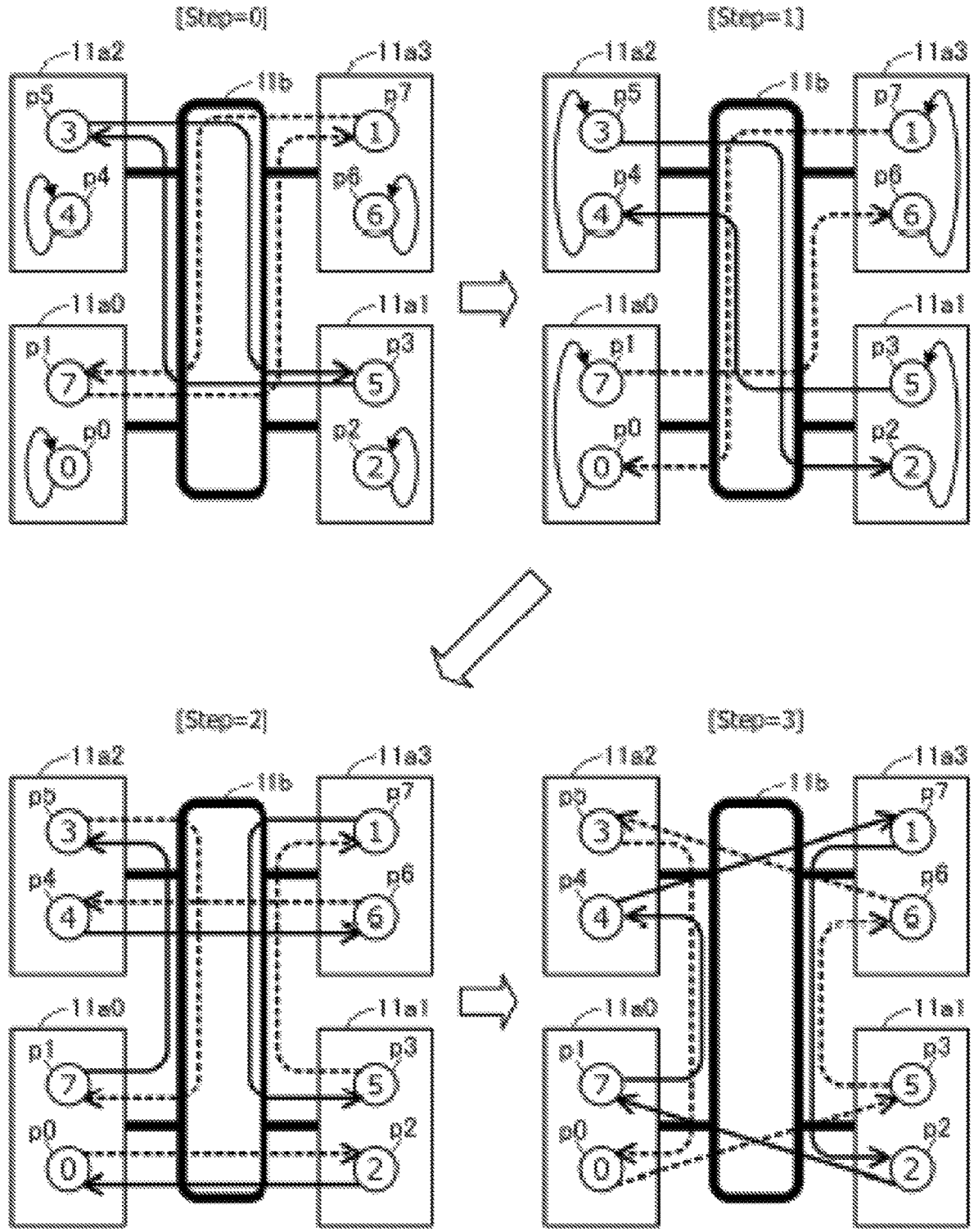
FIG. 21 illustrates an example of all-to-all communication based on virtual rank numbers.

FIG. 21 illustrates an example of all-to-all communication based on virtual rank numbers.

In Step=0, the following communication sessions are executed. In this connection, explanation of data reception by each process is omitted.

The process p0 transmits data to the process p0.

The process p1 transmits data to the process p7 through the counterclockwise path.

The process p2 transmits data to the process p2.

The process p3 transmits data to the process p5 through the clockwise path.

The process p4 transmits data to the process p4.

The process p5 transmits data to the process p3 through the clockwise path.

The process p6 transmits data to the process p6.

The process p7 transmits data to the process p1 through the counterclockwise path.

In Step=1, the following communication sessions are executed.

The process p0 transmits data to the process p1.

The process p1 transmits data to the process p6 through the counterclockwise path.

The process p2 transmits data to the process p3.

The process p3 transmits data to the process p4 through the clockwise path.

The process p4 transmits data to the process p5.

The process p5 transmits data to the process p2 through the clockwise path.

The process p6 transmits data to the process p7.

The process p7 transmits data to the process p0 through the counterclockwise path.

In Step=2, the following communication sessions are executed.

The process p0 transmits data to the process p2 through the counterclockwise path.

The process p1 transmits data to the process p5 through the clockwise path.

The process p2 transmits data to the process p0 through the clockwise path.

The process p3 transmits data to the process p7 through the counterclockwise path.

The process p4 transmits data to the process p6 through the clockwise path.

The process p5 transmits data to the process p1 through the counterclockwise path.

The process p6 transmits data to the process p4 through the counterclockwise path.

The process p7 transmits data to the process p3 through the clockwise path.

In Step=3, the following communication sessions are executed.

The process p0 transmits data to the process p3 through the counterclockwise path.

The process p1 transmits data to the process p4 through the clockwise path.

The process p2 transmits data to the process p1 through the clockwise path.

The process p3 transmits data to the process p6 through the counterclockwise path.

The process p4 transmits data to the process p7 through the clockwise path.

The process p5 transmits data to the process p0 through the counterclockwise path.

The process p6 transmits data to the process p5 through the counterclockwise path.

The process p7 transmits data to the process p2 through the clockwise path.

Figure 22:
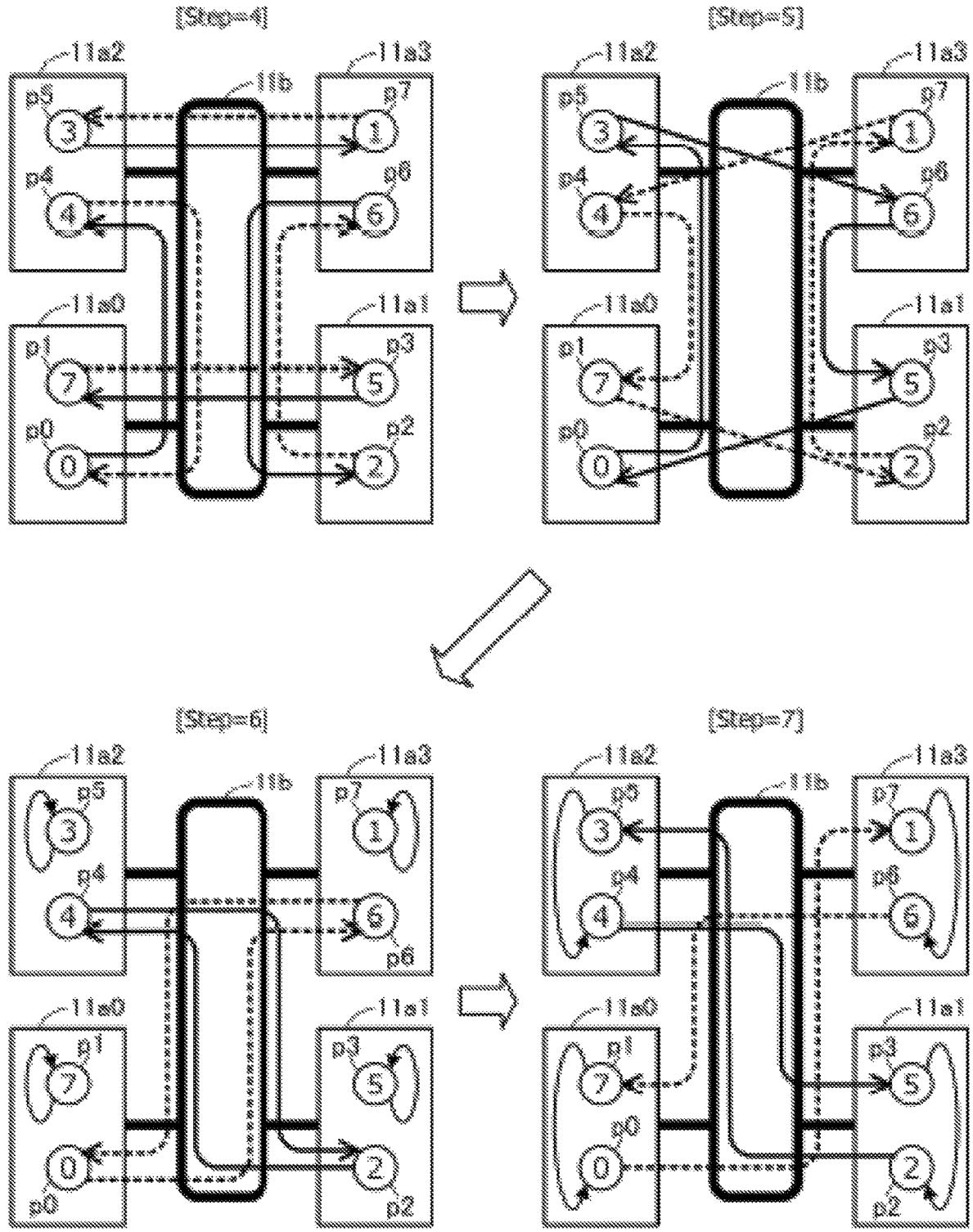
FIG. 22 illustrates an example of all-to-all communication based on virtual rank numbers.

FIG. 22 illustrates an example of all-to-all communication based on virtual rank numbers.

In Step=4, the following communication sessions are executed.

The process p0 transmits data to the process p4 through the clockwise path.

The process p1 transmits data to the process p3 through the counterclockwise path.

The process p2 transmits data c the process p6 through the counterclockwise path.

The process p3 transmit data to the process p1 through the clockwise path.

The process p4 transmits data to the process p0 through the counterclockwise path.

The process p5 transmits data to the process p7 through the clockwise path.

The process p6 transmits data to the process p2 through the clockwise path.

The process p7 transmits data the process p5 through the counterclockwise path.

Step=5, the following communication sessions are executed.

The process p0 transmits data to the process p5 through the clockwise path.

The process p1 transmits data to the process p2 through the counterclockwise path.

The process p2 transmits data to the process p7 through the counterclockwise path.

The process p3 transmits data to the process p0 through the clockwise path.

The process p4 transmits data to the process p1 through the counterclockwise path.

The process p5 transmits data to the process p6 through the clockwise path.

The process p6 transmits data to the process p3 through the clockwise path.

The process p7 transmits data to the process p4 through the counterclockwise path.

In Step=6, the following communication sessions are executed.

The process p0 transmits data to the process p6 through the counterclockwise path.

The process p1 transmits data to the process p1.

The process p2 transmits data to the process p4 through the clockwise path.

The process p3 transmits data to the process p5.

The process p4 transmits data to the process p2 through the clockwise path.

The process p5 transmits data to the process p5.

The process p6 transmits data to the process p0 through the counterclockwise path.

The process p7 transmits data to the process p7.

In Step=7, the following communication sessions are executed.

The process p0 transmits data to the process p7 through the counterclockwise path.

The process p1 transmits data to the process p0.

The process p2 transmits data to the process p5 through the clockwise path.

The process p3 transmits data to the process p2.

The process p4 transmits data to the process p3 through the clockwise path.

The process p5 transmits data to the process p4.

The process p6 transmits data to the process p1 through the counterclockwise path.

The process p7 transmits data the process p6.

As described the CPU 11 determines communication partner process of each process with an exclusive OR operation, By doing so, it becomes possible to prevent a partial zone of the first communication path 11b0 and a partial zone of the second communication path 11b1 from being shared by communication sessions between two or more pairs of processes.

In the example of the second embodiment, any part of the clockwise path (first communication path 11b0) and counterclockwise path (second communication path 11b1) on the ring bus 11b a s not shared in every step in the all-to-all communication. Therefore, it possible to perform fast a all-to-all communication without causing congestion in the ring bus 11b.

Further, the use of virtual rank numbers contributes fast all-to-all communication, irrespective of a policy of assigning an identification number to each process by an external factor such as user, an OS, a communication library, or job scheduler. Still further, a communication partner process of each process is determined with simple computation using an exclusive OR operation. Thus, is possible to determine the communication partner process of each process at high speed.

Third Embodiment

A third embodiment will now be described. Features different from those of the second embodiment are mainly described, and the description of the same features is omitted.

The second embodiment describes an example in which each of the nodes 11a0 to 11a3 performs two processes. Alternatively, each of the nodes 11a0 to 11a3 may perform three or more processes. The third embodiment describes an example in which each node 11a0 to 11a3 performs three processes. The information processing apparatus 10 of the third embodiment has the same hardware configuration as that of the second embodiment exemplified in FIG. 2. Each process performs the procedure exemplified in FIG. 13 to perform all-to-all communication involved in execution of a parallel program.

Figure 23:
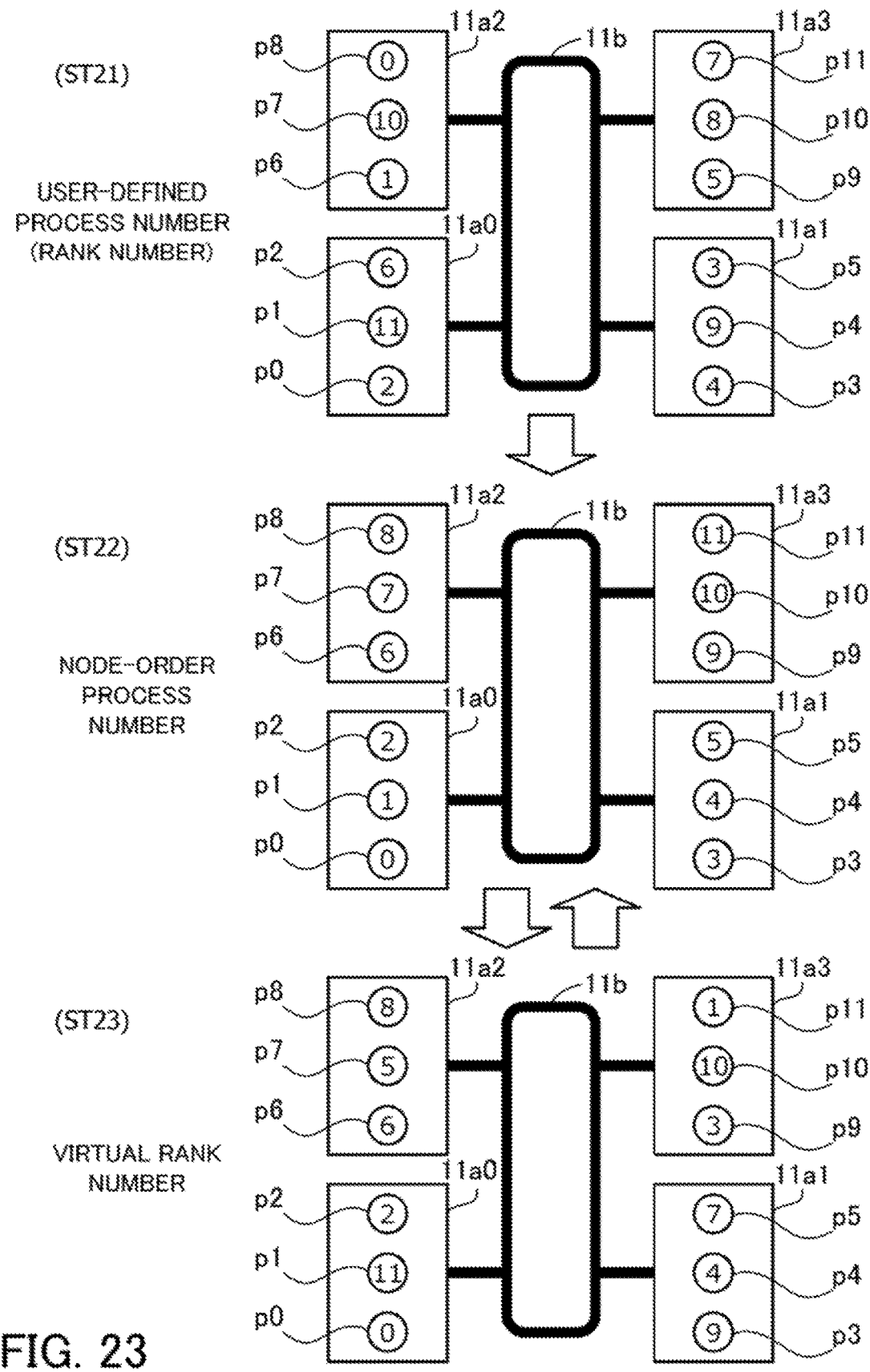
FIG. 23 illustrates a example of how to determine virtual rank numbers according to a third embodiment.

FIG. 23 illustrates an example of how to determine virtual rank numbers according to the third embodiment.

The nodes 11a0 to 11a3 have the same node numbers as described in the second embodiment. That is, the node 11a0 has a node number "0." The node 11a1 has a node number "1." The node 11a2 has a node number "2." The node 11a3 has a node number "3."

The node 11a0 performs processes p0, p1, and p2 in parallel. The node 11a1 performs processes p3, p4, and p5 in parallel. The node 11a2 performs processes p6, p7, and p8 in parallel. The node 11a3 performs processes p9, p10, and p11 in parallel.

The processes p0 to p11 assign previously-designated user-defined process numbers to the processes p0 to p11 (ST21). For example, the process p0 is assigned a user-defined process number "2." The process p1 is assigned a user-defined process number "11." The process p2 is assigned a user-defined process number "6." The process p3 is assigned a user-defined process number "4." The process p4 is assigned a user-defined process number "9." The process p5 is assigned a user-defined process number "3." The process p6 is assigned a user-defined process number "1." The process p7 is assigned a user-defined process number "10." The process p8 is assigned a user-defined process number "0." The process p9 is assigned a user-defined process number "5." The process p10 is assigned a use-defined process number "8." The process p11 is assigned a user-defined process number "7." The user-defined process numbers correspond to the rank numbers previously determined by a user or another.

The processes p0 to p11 create a rank number table 122 through communication between the processes. The process p0 to p11 determine the node order process number of each process p0 to p11 with reference to the CPU core number table 121 and rank number table 122 (ST22), The node-order process numbers in ascending order starting with zero are assigned to the processes in ascending order from a process belonging to a with the smallest node number, with reference to the CPU core number table 121. In the case where one node performs a plurality of processes, the node-order process numbers are assigned to the plurality of processes in a certain order. For example, the node-order process numbers may be assigned in order of CPU core number, for example.

The process p0 is assigned a node-order process number "0." The process p1 is assigned a node-order process number "1." The process p2 is assigned a node-order process number "2." The process p3 is assigned a node-order process number "3." The process p4 is assigned a node-order process number "4." The process process p6 is assigned a node-order process number "6." The process is assigned a node-order process number "7." The process p8 is assigned a node-order process number "8." The process p9 is assigned a node-order process number "9" The process p10 is assigned a node-order process number "10." The process p11 is assigned a node-order process number "11."

The processes p0 to p11 determine the virtual rank number of each process p0 to p11 with the equation (1) using the node-order process number of the process p0 to p11 (ST23). Here, in the third embodiment, Size=12 in the equation (2). The virtual rank number of the process p0 is "0." The virtual number of the process p1 is "11." The virtual rank number of the process p2 is "2." The virtual rank number of the process p3 is "9." The virtual rank number of the process p4 is "4." The virtual rank number of the process p5 is "7." The virtual rank number of the process p6 is "6." The virtual rank number of the process p7 is "5." The virtual rank number of the process p8 is "8." The virtual rank number of the process p9 is "3." The virtual rank number of the process p10 is "10." The virtual rank number of the process p11 is "11."

Figure 24:
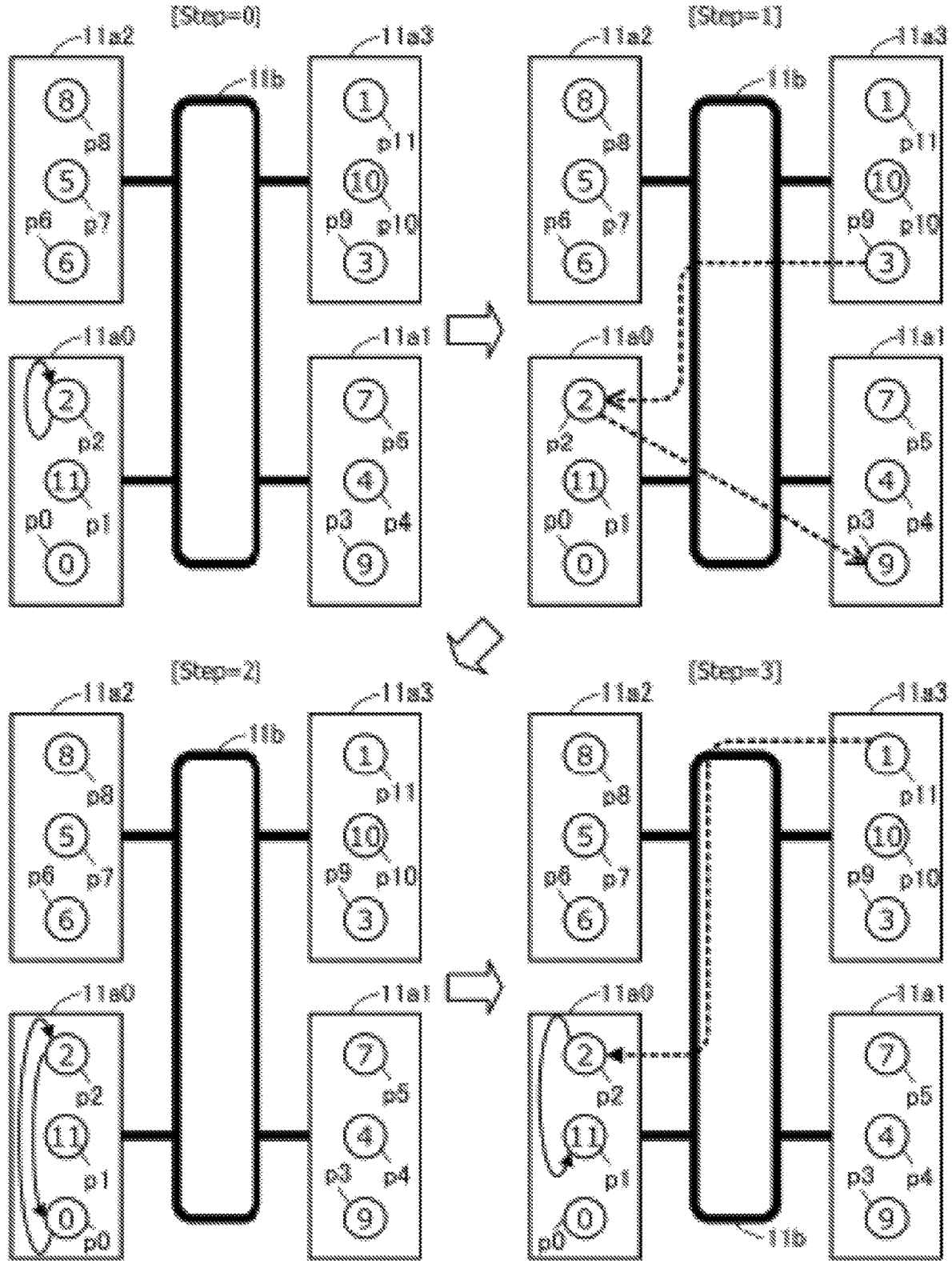
FIG. 24 illustrates an example of all-to-all communication based on virtual rank numbers.

FIG. 24 illustrates an example of all-to-all communication based on virtual rank numbers.

Figure 25:
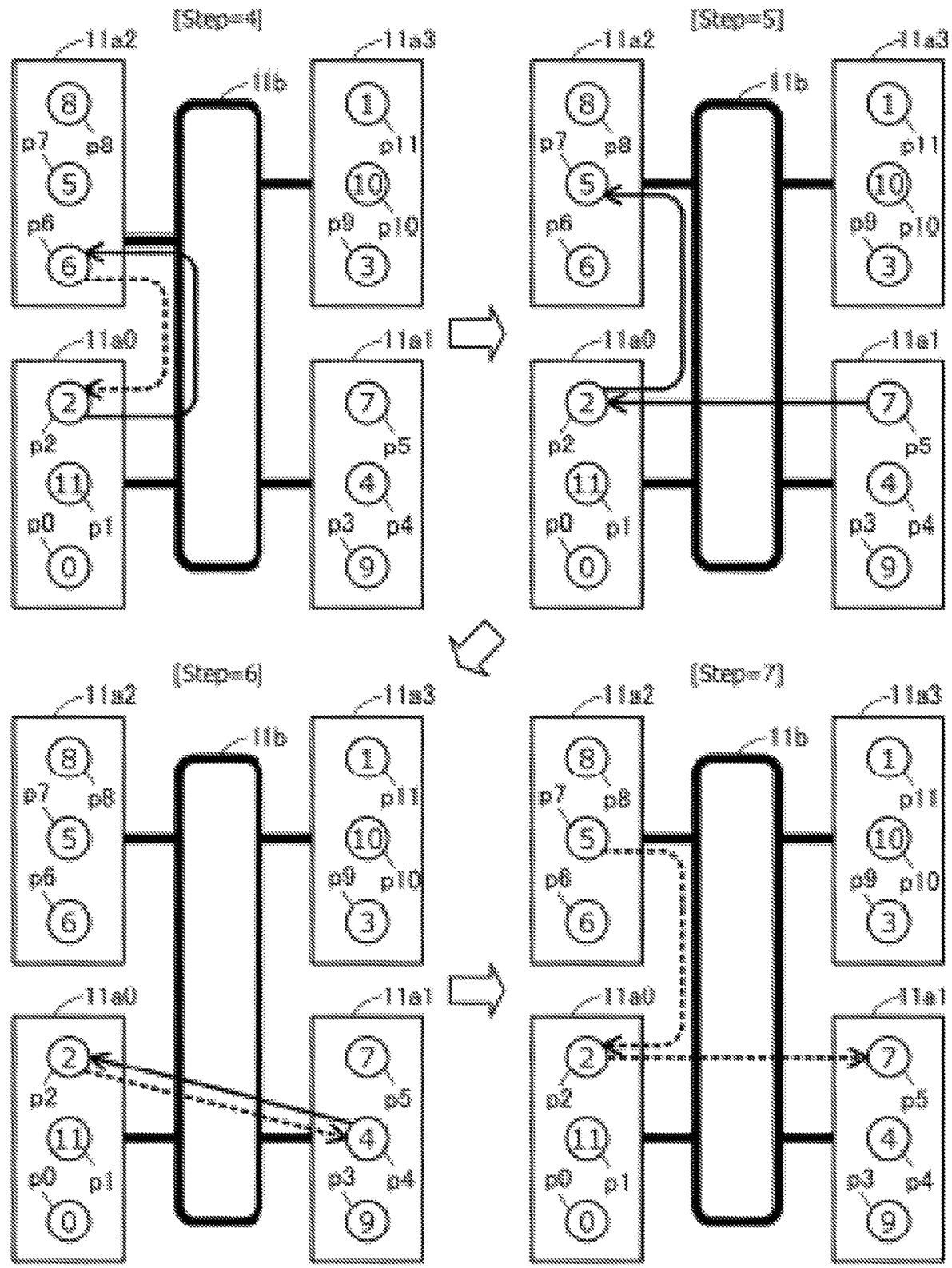
FIG. 25 illustrates an example of all-to-all communication based on virtual rank numbers.
Figure 26:
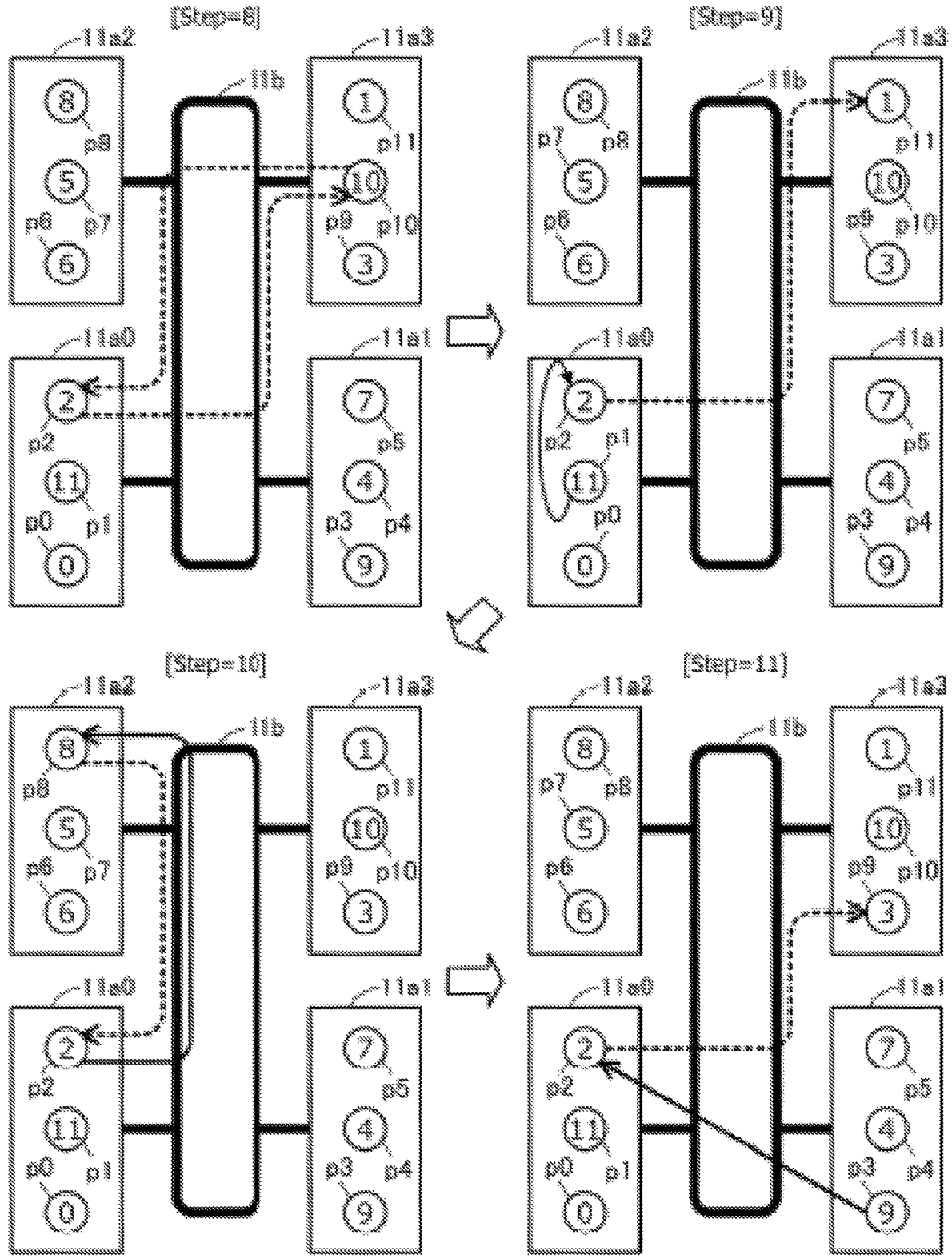
FIG. 26 illustrates an example of all-to-all communication based on virtual rank numbers.

With respect to the process p2 (virtual rank number "2") FIGS. 24 to 26 exemplify communication sessions in which the process p2 is a transmission source or a transmission destination. The value in each circle representing one of the processes p0 to p11 indicates the virtual number of the process.

In each step of all-to-all communication, the virtual rank number of a data transmission destination process with respect to each process is computed with the equation (2) and equation (1). In addition, the virtual rank number of a data transmission source process with respect to each process is computed with the equation (3) and equation (1).

In Step=0, the process p2 transmits data to the process p2. The process p2 receives the data from the process p2. For example, the data transmission from the process p2 to the process p2 means transferring the data stored in the transmit buffer of the process p2 to the receive buffer thereof.

In Step=1, the process p2 transmits data to the process p3 through a counterclockwise path of the ring bus 11b. The process p3 receives the data from the process p2. In addition, the process p9 transmits data the process p2 through the counterclockwise path. The process p2 receives the data from the process p9.

In Step=2, the process p2 transmits data to the process p0. The process p0 receives the data from the process p2. In addition, the process p0 transmits data to the process p2. The process p2 receives the data from the process p0.

In Step=3, the process p2 transmits data to the process p1. The process p1 receives the data from the process p2. In addition, the process p11 transmits data to the process p2 through the counterclockwise path. The process p2 receives the data from the process p11.

FIG. 25 illustrates an example of all-to-all communication based on virtual rank numbers.

In Step=4, the process p2 transmits data to the process D6 through a clockwise path. The process p6 receives the data from the process p2. In addition, the process p6 transmits data to the process p2 through the counterclockwise path. The process p2 receives the data from the process p6.

In Step=5, the process p2 transmits data to the process p7 through the clockwise path. The process p7 receives the data from the process p2. In addition, the process p5 transmits data to the process p2 through the clockwise path. The process p2 receives the data from the process p5.

In Step=6, the process 2 transmits data to the process p4 through the counterclockwise path. The process p4 receives the data from the process p2. In addition, the process p4 transmits data to the process p2 through the clockwise path. The process p2 receives the data from the process p4.

In Step=7, the process p2 transmits data to the process p5 through the counterclockwise path. The process p5 receives the data from the process p2. In addition, the process p7 transmits data to the process p2 through the counterclockwise path. The process receives the data from the process p7.

FIG. 26 illustrates an example of all-to-all communication based on virtual rank numbers.

In Step=8, the process p2 transmits data to the process p10 through the counterclockwise path. The process p10 receives the data from the process p2. In addition, the process p10 transmits data the process p2 through the counterclockwise path. The process receives the data from the process p10.

In Step=9, the process p2 transmits data to the process p11 through the counterclockwise path. The process p11 receives the data from the process p2. In addition, the process pa transmits data to the process p2. The process p2 receives the data from the process p1.

In Step=10, the process p2 transmits data to the process p8 through the clockwise path. The process p8 receives the data from the process p2. In addition, the process p3 transmits data to the process p2 through the counterclockwise path. The process p2 receives the data from the process p8.

In Step 11, the process p2 transmits data to the process p9 through the counterclockwise path. The process p9 receives the data from the process p2. In addition, the process p3 transmits data to the process p2 through the clockwise path. The process p2 receives the data from the process p3.

Note that each process other than the process p2 communicate with a different one of the processes in each step the way described above, even in the case where three or more processes are performed by each node, it is possible to perform all-to-all communication based on the virtual rank numbers. In addition it is possible to minimize the possibility of sharing the communication paths the all-to-all communication to thereby reduce the occurrence congestion more than the case of using rank numbers previously assigned by a user or another. That is, it is possible to minimize the frequency of occurrence of congestion throughout the all-to-all communication from the first to the final step. As a result, fast all-to-all communication is achieved.

Further, the use of the virtual rank numbers contributes to fast all-to-all communication, irrespective of a policy of assigning an identification number to each process by an external factor such as a user, an OS, a communication library, or a job scheduler. Still further, a communication partner process of each process is determined with simple computation using an exclusive OR operation. Thus, it is possible to determine the communication partner process of each process at high speed.

Fourth Embodiment

A fourth embodiment will now be described. Features different from those of the second and third embodiments are mainly described, and the description of the same features is omitted.

The second and third embodiments describe examples in which each of the nodes 11a0 to 11a3 performs the same number of processes. Alternatively, some of the nodes 11a0 to 11a3 may perform a different number of processes. The fourth embodiment describes an example in which each of the nodes 11a0 to 11a2 in the CPU 11 performs two processes and the node 11a3 performs one process. An information processing apparatus 10 of the fourth embodiment has the same hardware configuration as that of the second embodiment, exemplified in FIG. 2. Each process performs the procedure exemplified in FIG. 13 to perform all-to-all communication involved in execution of a parallel program.

Figure 27:
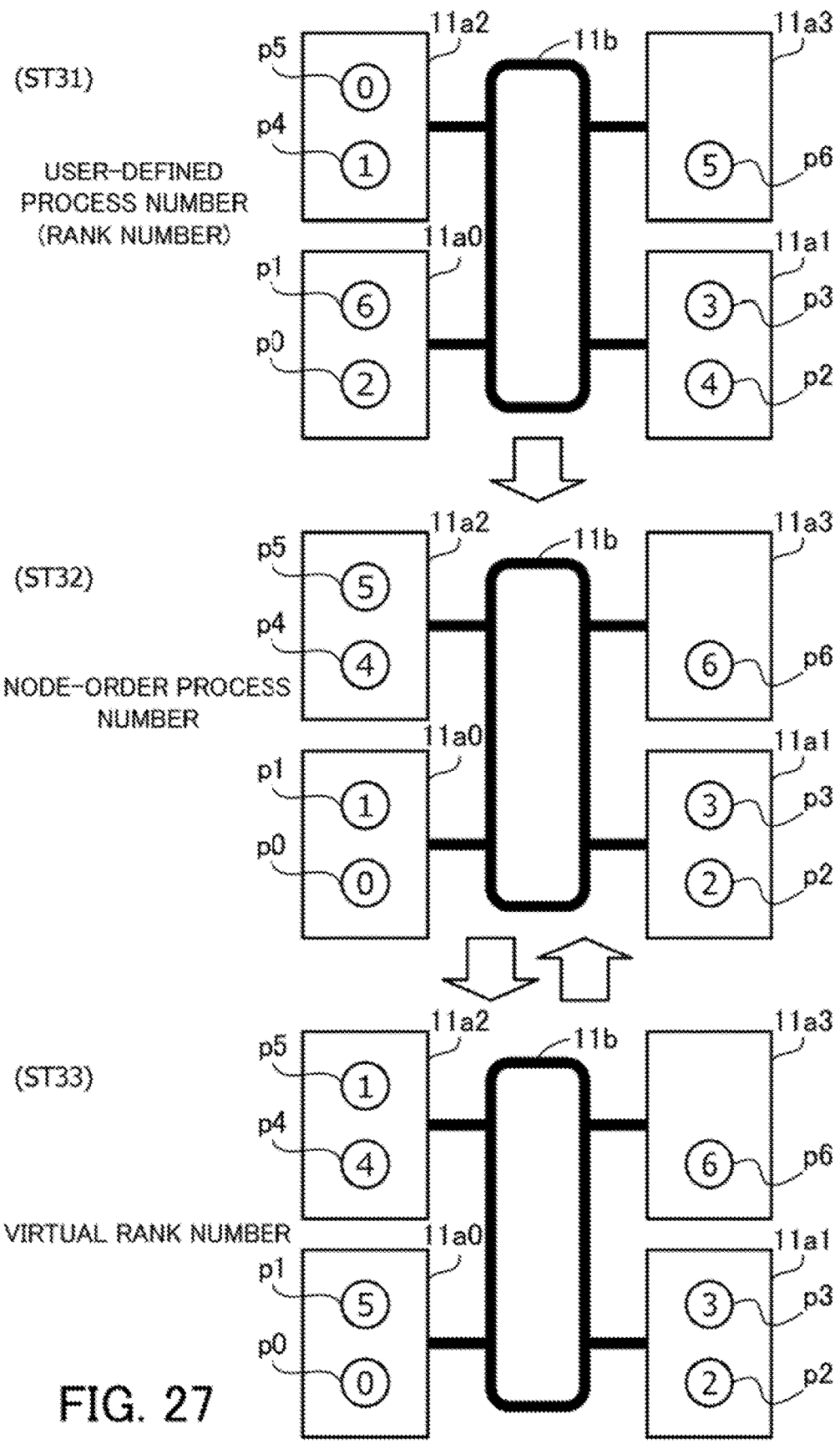
FIG. 27 illustrates an example of how to determine virtual rank numbers according to a fourth embodiment.

FIG. 27 illustrates an example of how to determine virtual rank numbers according to the fourth embodiment.

The nodes 11a0 to 11a3 have the same node numbers as described in the second embodiment. That is, the node 11a0 has a node number "0." The node 11a1 has a node number "1." The node 11a2 has a node number "2." The node 11a3 has a node number "3."

The node 11a0 performs processes p0 and p1 in parallel. The node 11a1 performs processes p2 and p3 in parallel. The node 11a2 performs processes p4 and p5 in parallel. The node 11a3 performs a process p6.

The processes p0 to p6 assign previously-designated user-defined process numbers to the processes p0 to p6 (ST31). For example, the process p0 is assigned a user-defined process number "2." The process p1 is assigned a user-defined process number "6." The process p2 is assigned a user-defined process number "4." The process p3 is assigned a user-defined process number "3." The process p4 is assigned a user-defined process number "1." The process p5 is assigned a user-defined process number "0." The process p6 is assigned a user-defined process number "5." The user-defined process numbers correspond to the rank numbers previously determined by a user or another.

The processes p0 to p6 create a rank number table 122 through communication between the processes. The processes p0 to p6 determine the node-order process number of each process p0 to p6 with reference to the CPU core number table 121 and rank number table 122 (ST32). The node-order process numbers in ascending order starting with zero are assigned to the processes in ascending order from a process belonging to a node with the smallest node number, with reference to the CPU core number table 121. In the case where one node performs a plurality of processes, the node-order process numbers are assigned to the plurality of processes in a certain order. For example, the node-order process numbers may be assigned in order of CPU core number.

The process p0 is assigned a node-order process number "0." The process p1 is assigned a node-order process number "1." The process p2 is assigned a node-order process number "2." The process p3 is assigned a node-order process number "3." The process p4 is assigned a node-order process number "4." The process p5 is assigned a node-order process number "5." The process p6 is assigned a node-order process number "6."

The processes p0 to p6 determine the virtual rank number of each process p0 to p6 with the equation (1) using the node-order process number of the process p0 to p6 (ST33). In the case where Size is an odd number, Size in the equation (1) for obtaining a virtual rank number may be replaced with Size'=Size−1. The virtual rank number of the process p0 is "0." The virtual rank number of the process p1 is "5." The virtual rank number of the process p2 is "2." The virtual rank number of the process p3 is "3." The virtual rank number of the process p4 is "4." The virtual rank number of the process p5 is "1." The virtual rank number of the process p6 is "6."

FIG. 28 illustrates an example of computing the virtual rank number of a transmission destination.

A table 127 represents an example of computing the virtual rank number of a data transmission destination process with respect to the process p1 with virtual rank number "5" in each step of all-to-all communication. In the example of the fourth embodiment, Size=7, which is not power of two. Therefore, Maxstep is the smallest power of two greater than seven, i.e., eight.

In Step=0, the node-order process number of the data transmission destination process computed with the equation (2) is "0^5=5." Therefore, the virtual rank number of the data transmission destination process is "1."

In Step=1, the node-order process number of the data transmission destination process is "1^5=4." Therefore, the virtual rank number of the data transmission destination process is "4."

In Step=2, the node-order process number of the data transmission destination process is "2^5=7." The node-order process number "7" does not exist. Therefore, no data transmission destination process is found (represented by hyphen "-").

In Step=3, the node-order process number of the data transmission destination process is "3^5=6." Therefore, the virtual rank number of the data transmission destination process is "6."

In Step=4, the node-order process number of the data transmission destination process is "4^5=1." Therefore, the virtual a a e number of the data transmission destination process is "5."

In Step=5, the node-order process number of the data transmission destination process is "5^5=0." Therefore, the virtual rank number of the data transmission destination process is "0."

In Step=6, the node-order process number of the data transmission destination process is "6^5=3." Therefore, the virtual rank number of the data transmission destination process is "3."

In Step=7, the node-order processes number of the data transmission destination process is "7^5=2." Therefore, the virtual rank number of the data transmission destination process is "2."

The following exemplifies communication between the processes p0 to p6 in each step of the all-to-all communication.

Figure 29:
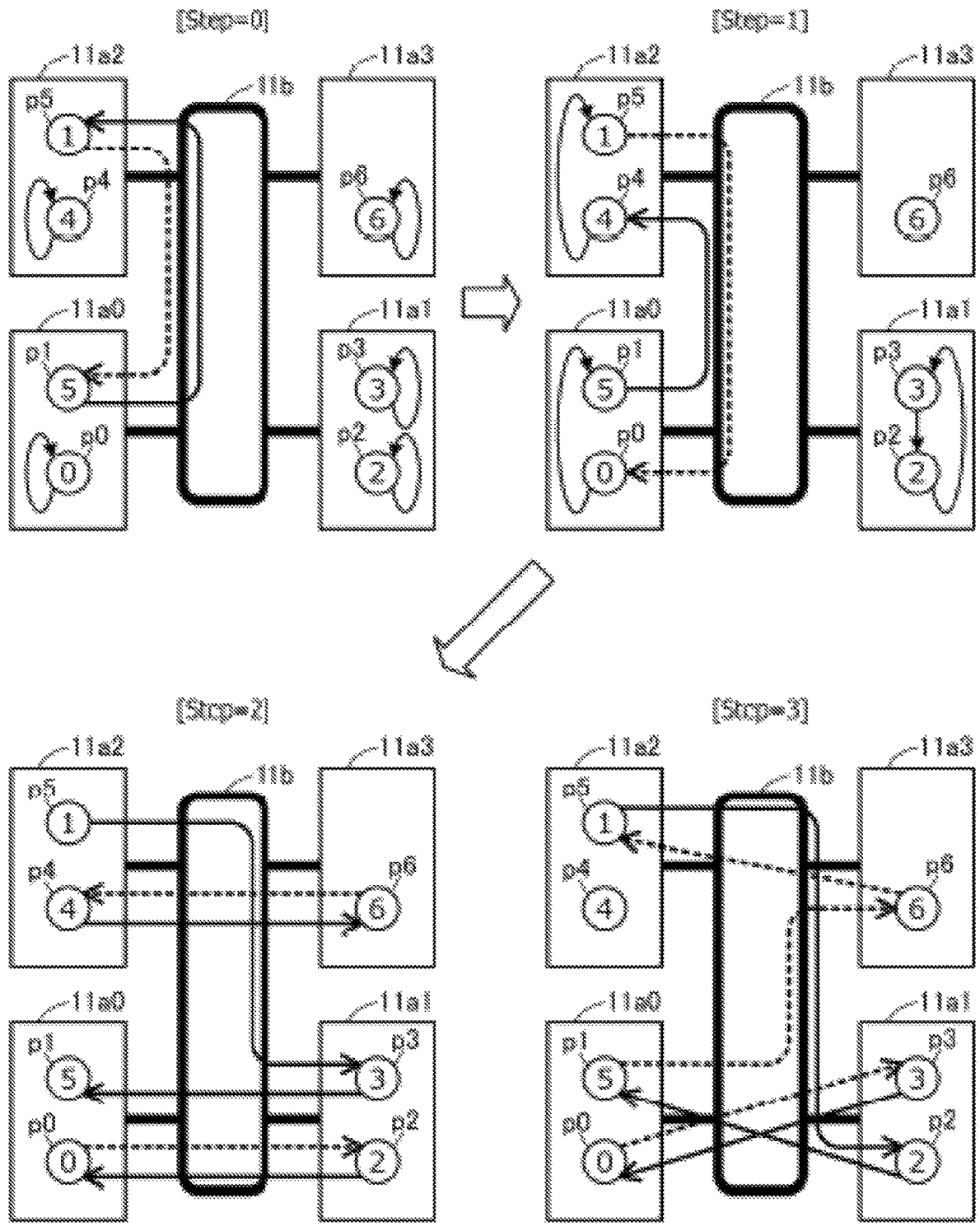
FIG. 29 illustrates an example of all-to-all communication based on virtual rank numbers.

FIG. 29 illustrates an example of all-to-all communication based on virtual rank numbers.

In Step=0, the following communication sessions are executed. In this connection, explanation of data reception by each process is omitted.

The process p0 transmits data to the process p0.
The process p1 transmits data to the process p5 through the clockwise path.
The process p2 transmits data to the process p2.
The process p3 transmits data to the process p3.
The process p4 transmits data to the process p4.
The process p5 transmits data to the process p1 through the counterclockwise path.
The process p6 transmits data to the process p6.

In Step=1, the following communication sessions are executed.
The process p0 transmits data to the process p1.
The process p1 transmits data to the process p4 through the clockwise path.
The process p2 transmits data to the process p3.
The process p3 transmits data to the process p2.
The process p4 transmits data to the process p5.
The process p5 transmits data to the process p0 through the counterclockwise path.
The process p6 does not perform data transmission.

In Step=2, the following communication sessions are executed.
The process p0 transmits data to the process p2 through the counterclockwise path.

The process p1 does not perform data transmission.
The process p2 transmits data to the process p0 through the clockwise path.
The process p3 transmits data to the process p1 through the clockwise path.
The process p4 transmits data the process p6 through the clockwise path.
The process transmits data to the process p3 through the clockwise path.
The process p6 transmits data to the process p4 through the counterclockwise path.

In Step=3, the following communication sessions are executed.
The process p0 transmits data to the process p3 using the counterclockwise path.
The process p1 transmits data the process p6 through the counterclockwise path.
The process p2 transmits data to the process to p1 through the clockwise path.
The process p3 transmits data to the process p0 through the clockwise path.
The process p4 does not perform data transmission.
The process p5 transmits data to the process p2 through the clockwise path.
The process p6 transmits data to the process p5 through the counterclockwise path.

Figure 30:
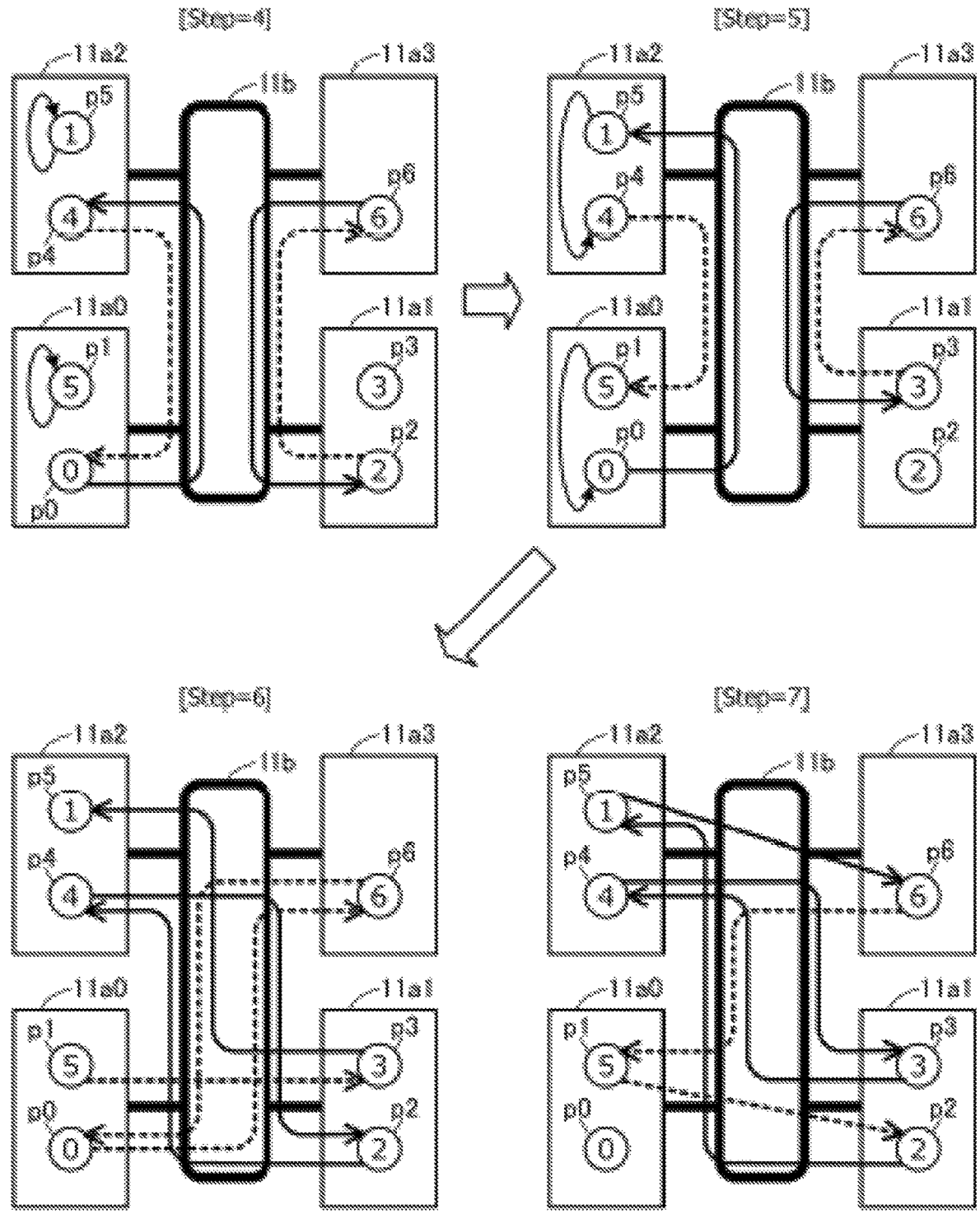
FIG. 30 illustrates an example of all-to-all communication based on virtual rank numbers.

FIG. 30 illustrates an example of all-to-all communication based on virtual rank numbers.

In Step=4, the following communication sessions are executed.
The process p0 transmits data to the process p4 through the clockwise path.
The process p1 transmits data to the process p1.
The process p2 transmits data to the process p6 through the counterclockwise path.
The process p3 does not perform data transmission.
The process p4 transmits data to the process p0 through the counterclockwise path.
The process p5 transmits data to the process p5.
The process p6 transmits data to the process p2 through the clockwise path.

In Step=5, the following communication sessions are executed.
The process p0 transmits data to the process p5 through the clockwise path.
The process p1 transmits data to the process p0.
The process p2 does not perform data transmission.
The process p3 transmits data to the process p6 through the counterclockwise path.
The process p4 transmits data to the process p1 through the counterclockwise path.
The process p5 transmits data to the process p4.
The process p6 transmits data to the process p3 through the clockwise path.

In Step=6, the following communication sessions are executed.
The process p0 transmits data to the process p6 through the counterclockwise path.
The process p1 transmits data to the process p3 through the counterclockwise path.
The process p2 transmits data to the process p4 through the clockwise path.
The process p3 transmits data to the process p5 through the clockwise path.
The process p4 transmits data to the process p2 through the clockwise path.
The process p5 does not perform data transmission.

The process p6 transmits data to the process p0 through the counterclockwise path.

In Step=7, the following communication sessions are executed.

The process p0 does not perform data transmission.

The process p1 transmits data to the process p2 through the counterclockwise path.

The process p2 transmits data to the process p5 through the clockwise path.

The process p3 transmits data to the process p4 through the clockwise path.

The process p4 transmits data to the process p3 through the clockwise path.

The process p5 transmits data to the process p6 through the clockwise path.

The process p6 transmits data to the process p1 through the counterclockwise path.

As described above, even in the case where some of the nodes 11a0 to 11a3 perform a different number of processes, the CPU 11 is able to perform all-to-all communication between the processes.

In this connection, the above-described case, in which the number of processes the node 11a3 becomes fewer than that in the other nodes, may occur when a process disappears while each node performs two processes as described in the second embodiment. For example, a process may disappear dace to a reduction in the number of cores in the node 11a3 (like a case where a core becomes unavailable due to a failure or the like). For example, if a process disappears while each node performs two processes, the remaining processes each execute S12 to S17 of FIG. 13 again to determine the node-order process numbers a and virtual rank numbers of the remaining processes again.

As described above, the CPU 11 updates the node-order process numbers and virtual rank numbers of the remaining processes when the number of processes in the CPU 11 is reduced after virtual rank numbers are once computed. Therefore, even if the number of processes is reduced during execution of the parallel program, the remaining processes are able to continue the processing by performing all-to-all communication.

Here, the following is said for the above-described second to fourth embodiments.

The occurrence of congestion is reduced the most in the information processing apparatus 10 when the following conditions are satisfied: "the number of processes existing in nodes is power of two (1, 2, 4, 8, 16, . . . ) and all the nodes perform the same number of processes." The example of the second embodiment satisfies these conditions. However, even if the conditions are not satisfied, the occurrence congestion is reduced more than the case of using rank numbers previously assigned by a user or another. In addition, even if the number of processes varies due to a reduction in the numbers of cores in any node, the virtual rank numbers are: determined again and the remaining processes are able to continue the processing by performing all-to-all communication.

The following exemplifies a parallel processing system using a plurality of information processing apparatuses 10 exemplified in second to fourth embodiments.

Figure 31:
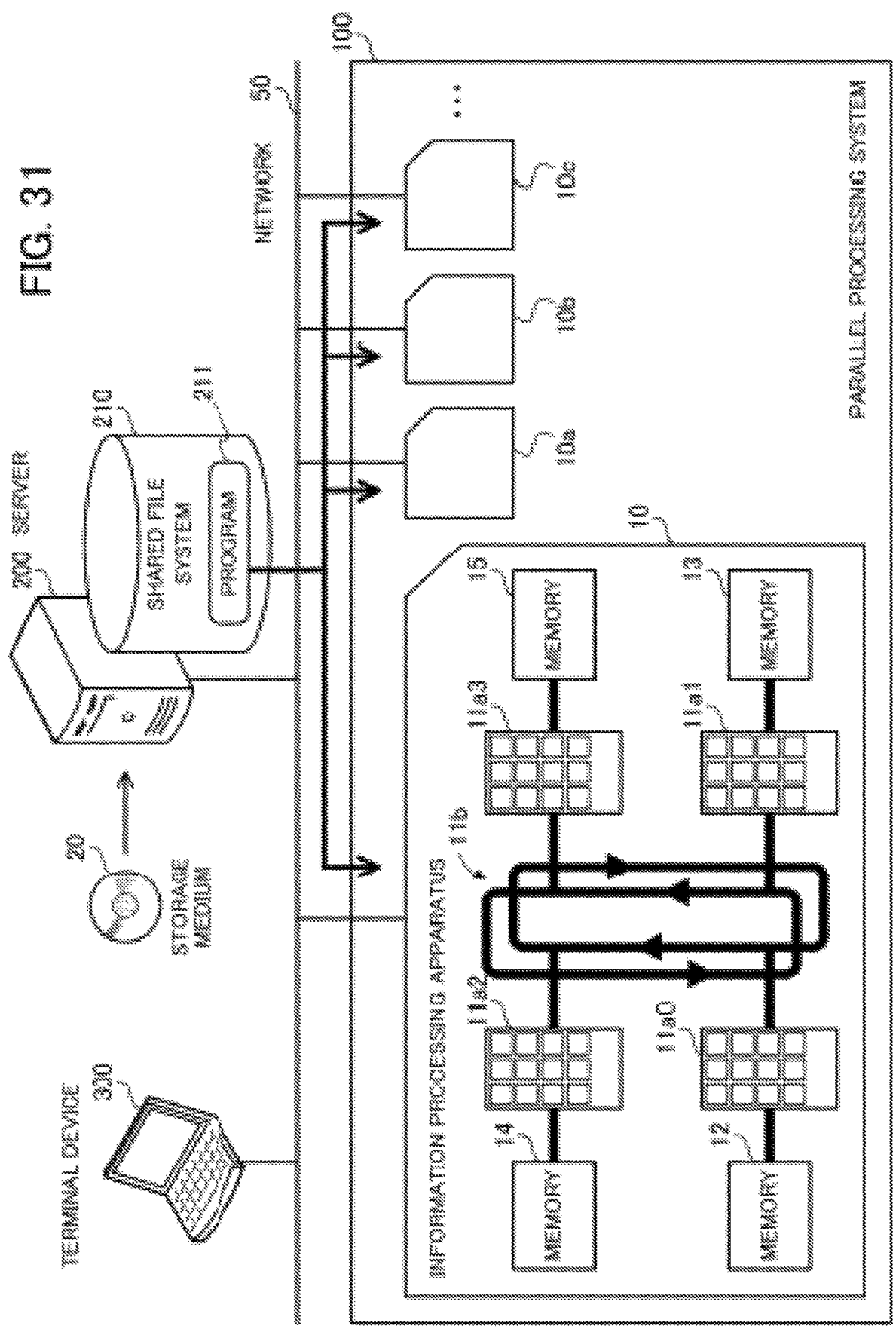
FIG. 31 illustrates an example of a parallel processing system.

FIG. 31 illustrates an example of a parallel processing system.

The parallel processing system 100 includes information processing apparatuses 10, 10a, 10b, 10c, . . . . In the parallel processing system 100, the information processing apparatuses 10, 10a, 10b, 10c, . . . are able to perform a plurality of processes belonging to the same job in parallel. One information processing apparatus includes a CPU including a plurality of nodes and a ring bus to which, the plurality of nodes are connected, and memories such as HBM2 devices connected to the respective nodes.

For example, the information processing apparatus 10 includes nodes 11a0, 11a1, 11a2, 11a3, a ring bus 11b, and memories 12, 13, 14, and 15, as described earlier. The nodes 11a0, 11a1, 11a2, 11a3 are connected to the ring bus 11b. The node 11a0 is connected to the memory. The node 11a1 is connected to the memory 13. The node 11a2 is connected to the memory 14. The node 11a3 is connected to the memory 15. In addition, the information processing apparatus 10 includes a communication interface (not illustrated). The information processing apparatus 10 is connected to a network 50 via the communication interface to communicate with other computers. In addition, the information processing apparatus 10 mutually communicates with the other information processing apparatuses in the parallel processing system 100 via interconnect (not illustrated) provided in the parallel processing system 100. For the interconnect for example, a Tofu (registered trademark) interconnect or another interconnect network that introduces a six-dimensional mesh/torus topology is used.

A server 200 and terminal device 300 are connected to the network 50.

The server 200 is as server computer that includes a CPU, a RAM, a hard disk drive (HDD), and auxiliary storage such as solid state drive (SSD), and implements a shared file system 210.

The information processing apparatuses 10, 10a, 10b, 10c, . . . access the shared file system 210 over the network 50, download a program 211 and data from the shared file system 210, and store them in their local memories. The program stored in the memory of each information processing apparatus is executed by the CPU of the information processing apparatus.

For example, the server 200 includes a media reader for reading the program 211 and data from a storage medium 20 and stores the read program 211 and data in the shared file system 210. As the storage medium 20, for example, a magnetic disk, an optical disc, a magneto-optical disk (MO), a semiconductor memory, or another may be used. Magnetic disks include flexible disks (FDs) and HDDs. Optical discs include compact discs (CDs) and digital versatile discs (DVDs). The storage medium 20 may be called a portable storage medium and may used for distribution of programs and data. In addition, the storage medium 20 may be called a computer-readable storage medium.

The terminal device 300 is a client computer that is used by a user. For example, the terminal device 300 enters an instruction for starting execution of a parallel program to the parallel processing system 100 and sets an execution schedule for the parallel program in the parallel processing system 100. In addition, the terminal device 300 may be used to display a result of executing the parallel program on a display provided in the terminal device 300 for the user to confirm the execution result.

Here, in the field of high-performance computing (HPC), a large-scale system is being developed by increasing the number of nodes and/or with a many-core architecture using an increased number of cores in a CPU for performance improvement.

In the field of HPC, MPI is often used as a standard for parallel computing. In the parallel processing system 100, a large number of MPI processes are performed simultaneously to thereby achieve parallel processing. Since an increased number of MPI processes are performed in a large-scale system, communication performance between the MPI processes are important. The information processing apparatuses 10, 10a, 10b, 10c, . . . are able to achieve fast processing that, involves all-to-all communication between the processes within each information processing apparatus, which enables the parallel processing system 100 as a whole to perform fast processing.

According to one aspect, it is possible to reduce the occurrence of congestion.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus, comprising:
    a memory configured to store therein virtual rank numbers of each of a plurality of processes, the virtual rank numbers being respectively unique to the plurality of processes; and
    a processor configured to perform procedures including
        generating, in initial setting of all-to-all communication between the plurality of processes, node-order process numbers of each of the plurality of processes, based on hardware information, the node-order process numbers being respectively unique to the plurality of processes,
        computing the virtual rank numbers of the plurality of processes, based on the node-order process numbers and storing the computed virtual rank numbers in the memory,
        determining, in performing the all-to-all communication between the plurality of processes, a communication partner process of each of the plurality of processes for a current step in the all-to-all communication by performing an exclusive OR operation between a virtual rank number of said each process, stored in the memory, and a step number of the current step, the exclusive OR operation, between the virtual rank number of a first process among the plurality of processes and the step number of the current step, calculating a node-order process number of the communication partner process of the first process for the current step, and
        performing a communication session from said each process to the determined communication partner process,
    the hardware information includes a node number of each of a plurality of nodes that perform the plurality of processes and a core number of each of a plurality of cores included in each of the plurality of nodes, and
    the generating of the node-order process numbers includes obtaining core numbers of cores each assigned one of the plurality of processes and generating the node-order process numbers of the plurality of processes assigned to the cores in order of node numbers corresponding to the obtained core numbers, based on the hardware information.

2. The information processing apparatus according to claim 1, wherein the procedures further include synchronizing completion of communication sessions from the plurality of processes and incrementing the step number.

3. The information processing apparatus according to claim 1, wherein:
    the processor includes a plurality of nodes that perform the plurality of processes, and a ring bus to which the plurality of nodes are connected, the ring bus including a first communication path that is a clockwise path and a second communication path that is a counterclockwise path; and
    the exclusive OR operation is performed to determine the communication partner process of said each process so as to prevent a partial zone of the first communication path and a partial zone of the second communication path from being shared by communication sessions of two or more pairs of processes among the plurality of processes.

4. The information processing apparatus according to claim 1, wherein:
    the determining of the communication partner process includes
        determining a data transmission destination process of said each process for the current step by performing a first exclusive OR operation between the virtual rank number and the step number, and
        determining a data transmission source process of said each process for the current step by performing a second exclusive OR operation between the virtual rank number and the step number; and
    the performing of the communication session from said each process to the determined communication partner process includes data transmission from said each process to the data transmission destination process and data reception of said each process from the data transmission source process.

5. The information processing apparatus according to claim 1, wherein the procedures further include updating, in response to a reduction in a number of processes after the computing of the virtual rank numbers, the node-order process numbers and the virtual rank numbers with respect to remaining processes of the plurality of processes.

6. A non-transitory computer-readable storage medium storing a parallel computing program that causes a computer to perform a procedure comprising:
    generating, in initial setting of all-to-all communication between a plurality of processes, node-order process numbers of each of the plurality of processes based on hardware information, the node-order process numbers being respectively unique to the plurality of processes,
    computing virtual rank numbers of the plurality of processes, based on the node-order process numbers and storing the computed virtual rank numbers in a memory the virtual rank numbers being respectively unique to the plurality of processes;
    determining, in performing the all-to-all communication between the plurality of processes, a communication partner process of each of the plurality of processes for a current step in the all-to-all communication by performing an exclusive OR operation between a virtual rank number of said each process, stored in the memory, and a step number of the current step, the exclusive OR operation, between the virtual rank number of a first process among the plurality of processes and the step number of the current step, calculating a node-order process number of the communication partner process of the first process for the current step, and performing a communication session from said each process to the determined communication partner process, the hardware information includes a node number of each of a plurality of nodes that perform the plurality of processes and a core number of each of a plurality of cores included in each of the plurality of nodes, and the generating of the node-order process numbers includes obtaining core numbers of cores each assigned one of the plurality of processes and generating the node-order process numbers of the plurality of processes assigned to the cores in order of node numbers corresponding to the obtained core numbers, based on the hardware information.

7. An information processing method implemented by a computer, comprising:

generating, in initial setting of all-to-all communication between a plurality of processes, node-order process numbers of each of the plurality of processes, based on hardware information, the node-order process numbers being respectively unique to the plurality of processes, computing virtual rank numbers of the plurality of processes, based on the node-order process numbers and storing the computed virtual rank numbers in a memory, the virtual rank numbers being respectively unique to the plurality of processes;

determining, in performing the all-to-all communication between the plurality of processes, a communication partner process of each of the plurality of processes for a current step in the all-to-all communication by performing an exclusive OR operation between a virtual rank number of said each process, stored in the memory, and a step number of the current step, the exclusive OR operation, between the virtual rank number of a first process among the plurality of processes and the step number of the current step, calculating a node-order process number of the communication partner process of the first process for the current step, and performing a communication session from said each process to the determined communication partner process, the hardware information includes a node number of each of a plurality of nodes that perform the plurality of processes and a core number of each of a plurality of cores included in each of the plurality of nodes, and the generating of the node-order process numbers includes obtaining core numbers of cores each assigned one of the plurality of processes and generating the node-order process numbers of the plurality of processes assigned to the cores in order of node numbers corresponding to the obtained core numbers, based on the hardware information.

* * * * *